United States Patent
Tasaka et al.

(10) Patent No.: US 7,306,832 B2
(45) Date of Patent: Dec. 11, 2007

(54) CELLULOSE ESTER FILM, ITS MANUFACTURING METHOD, OPTICAL RETARDATION FILM, OPTICAL COMPENSATION SHEET, ELLIPTIC POLARIZING PLATE, AND IMAGE DISPLAY

(75) Inventors: Koji Tasaka, Hino (JP); Hiroki Umeda, Hino (JP); Noriyasu Kuzuhara, Hino (JP); Takatoshi Yajima, Hino (JP)

(73) Assignee: Konica Corporation, Tokyo (JP)

( * ) Notice: Subject to any disclaimer, the term of this patent is extended or adjusted under 35 U.S.C. 154(b) by 68 days.

(21) Appl. No.: 10/965,329

(22) Filed: Oct. 14, 2004

(65) Prior Publication Data

US 2005/0046074 A1    Mar. 3, 2005

Related U.S. Application Data

(62) Division of application No. 10/154,188, filed on May 23, 2002, now Pat. No. 6,814,914.

(30) Foreign Application Priority Data

May 30, 2001  (JP)  ............................. 2001-162126
Sep. 26, 2001  (JP)  ............................. 2001-293650

(51) Int. Cl.
   *B29C 59/00*  (2006.01)
(52) U.S. Cl. ..................... 428/1.54; 428/1.1; 428/1.33; 349/118; 264/1.34; 264/208
(58) Field of Classification Search ................ 428/1.1, 428/1.33, 1.54; 349/117–120; 264/1.34, 264/2.7, 212, 217, 290.2, 207–208
   See application file for complete search history.

(56) References Cited

U.S. PATENT DOCUMENTS

| | | | | |
|---|---|---|---|---|
| 5,061,042 A | * | 10/1991 | Nakamura et al. | 349/102 |
| 5,219,510 A | * | 6/1993 | Machell et al. | 264/210.6 |
| 5,635,262 A | * | 6/1997 | Best et al. | 428/36.92 |
| 5,693,253 A | * | 12/1997 | Ohnishi et al. | 252/299.01 |
| 6,036,913 A | * | 3/2000 | Shibue et al. | 264/489 |
| 6,139,785 A | * | 10/2000 | Shuto et al. | 264/207 |
| 6,417,904 B1 | * | 7/2002 | Yamaoka et al. | 349/117 |
| 6,476,892 B2 | * | 11/2002 | Aminaka | 349/117 |
| 6,503,581 B1 | * | 1/2003 | Shibue et al. | 428/1.1 |
| 6,518,004 B2 | * | 2/2003 | Hashimoto | 430/501 |
| 6,582,645 B2 | * | 6/2003 | Takeda | 264/207 |
| 6,630,973 B1 | * | 10/2003 | Matsuoka et al. | 349/117 |
| 6,814,914 B2 | * | 11/2004 | Tasaka et al. | 264/217 |

* cited by examiner

*Primary Examiner*—Rena Dye
*Assistant Examiner*—Sow-Fun Hon
(74) *Attorney, Agent, or Firm*—Lucas & Mercanti, LLP

(57) ABSTRACT

A manufacturing method of a cellulose ester film satisfying the relationships, Nx>Ny>Nz, and $0.8 \leq R_t/R_0 \leq 3.5$, the method comprising casting a cellulose ester dope containing a solvent of a good solvent and a poor solvent on a support to form a web; peeling the web from the support; transporting the peeled web (step D0); holding the edges in the transverse direction of the web (step A); stretching the resulting web in the transverse direction while applying a tension; reducing the tension in the transverse direction of the web; and drying the stretched web, wherein the residual solvent content of the web is 5 to 90% by weight at the beginning in the step A, and the residual poor solvent content in the residual solvent content of the web is from 15 to 95% by weight at the terminal point in the Step D0.

10 Claims, 1 Drawing Sheet

CELLULOSE ESTER FILM, ITS MANUFACTURING METHOD, OPTICAL RETARDATION FILM, OPTICAL COMPENSATION SHEET, ELLIPTIC POLARIZING PLATE, AND IMAGE DISPLAY

CROSS REFERENCE TO RELATED APPLICATIONS

This Application is a divisional of U.S. application Ser. No. 10/154,188 filed May 23, 2002 now U.S. Pat. No. 6,814,914.

FIELD OF THE INVENTION

The present invention relates to a cellulose ester film and its manufacturing method, and an optical retardation film, an optical compensation sheet, an elliptic polarizing plate, and an image display.

BACKGROUND OF THE INVENTION

Recently, a personal computer has been adapted for multi-media, and color display has been generally used in a laptop type personal computer. In the laptop type personal computer or a desktop monitor, an STN type liquid crystal display or a TFT type liquid crystal display is mainly employed. In recent years, as the size of the liquid crystal display is increased, the TFT type liquid crystal display, which has an excellent image quality, has been predominated. Therefore, improvement of a viewing angle property has been eagerly required.

As a displaying mode of the TFT type liquid crystal display, an IPS mode or a vertical alignment (VA) mode is proposed and applied in addition to a conventional TN mode. A TN mode TFT liquid crystal display has characteristics in that cost of manufacture is reduced and efficiency of light utilization is high due to its optical rotatory mode. An optical compensation sheet developed-in recent years improves a viewing angle property and is widely used.

For example, an elliptic polarizing plate for viewing angle compensation has a multilayer structure, and a typical example thereof has a structure a first transparent support (ordinarily, a cellulose triacetate film)/a polarizer/a second transparent support (ordinarily, a cellulose ester film)/an optically anisotropic layer formed by fixing the orientation direction of a liquid crystal compound in a specific direction/a transparent support C (for example, a stretched cellulose ester film) having an optically biaxial property, wherein the structure is obtained by forming the optically anisotropic layer directly or indirectly on the second transparent support, and then forming the transparent support C having an optically biaxial property on the optically anisotropic layer.

The above structure is obtained by providing the optically anisotropic layer formed by fixing the orientation direction of a liquid crystal compound in a specific direction on the transparent support C.

As the first and second transparent supports, a cellulose triacetate film with a thickness from 40 to 80 μm manufactured according to a solution cast film manufacturing method is employed. A polyvinyl alcohol film doped with iodine and stretched is employed as a polarizer, and the polarizer is inserted between the first and second transparent supports to obtain a polarizing plate.

The optically anisotropic layer is formed, for example, by providing a layer containing a liquid crystal compound having a polymerizable group on a support given an orientation capability through rubbing treatment and fixing the orientation direction by hardening the layer by UV light irradiation. The support is a transparent support having an optically biaxial property, and preferably a stretched cellulose ester film having a thickness of 40 to 150 μm.

A cellulose ester film, which when continuously manufactured in view of productive efficiency, is stretched in the transverse direction, is preferably employed as a transparent support having an optically biaxial property.

As a method of stretching the film in the transverse direction, a tenter according to a tenter method is generally employed. In the tenter, clips are arranged at equal intervals and molecules are oriented only in the transverse direction, and there is neither orientation in the longitudinal direction of the molecules nor dimensional variation in the longitudinal direction. As a result, the film thickness is reduced in inverse proportional to the stretching magnitude, resulting in an increase of a retardation in the thickness direction. The dimension in the longitudinal direction is regulated and orientation of the molecules in the longitudinal direction of the film is also regulated. In stretching the film in the transverse direction, there is problem in that molecules are oriented in the transverse direction, and a contractive force is generated in the transverse direction, which increases a plane orientation of the molecules and results in an increase of a retardation in the thickness direction ($R_t$).

In a method of stretching in the transverse direction other than the tenter method above, there is also problem in that unintended stretching in the longitudinal direction excessively increases a retardation in the thickness direction as compared with a retardation in the plane of the film.

As a film used in an LCD display, it is important that the film has not only physical uniformity but optical uniformity. A film having a low uniformity of a retardation in the plane or a retardation in the thickness direction or a low uniformity of dispersion of an optically delayed phase axis (hereinafter referred to also as an orientation angle) causes a light leak at black display, resulting in a serious defect practically.

SUMMARY OF THE INVENTION

One object of the present invention is to provide a manufacturing method of a cellulose ester film having excellent optical properties, the cellulose ester film manufactured according to the method, and an optical retardation film, an elliptic polarizing plate, an optical compensation sheet and an image display each employing the cellulose ester film.

Another object of the present invention is to provide a manufacturing method of a cellulose ester film having physical and optical uniformity, the cellulose ester film suitable for a member of an image display, and an optical retardation film, an elliptic polarizing plate, and an optical compensation sheet each employing the cellulose ester film, and an image display employing the cellulose ester film, the optical retardation film, the elliptic polarizing plate, or the optical compensation sheet.

DETAILED DESCRIPTION OF THE INVENTION

Figure 1:
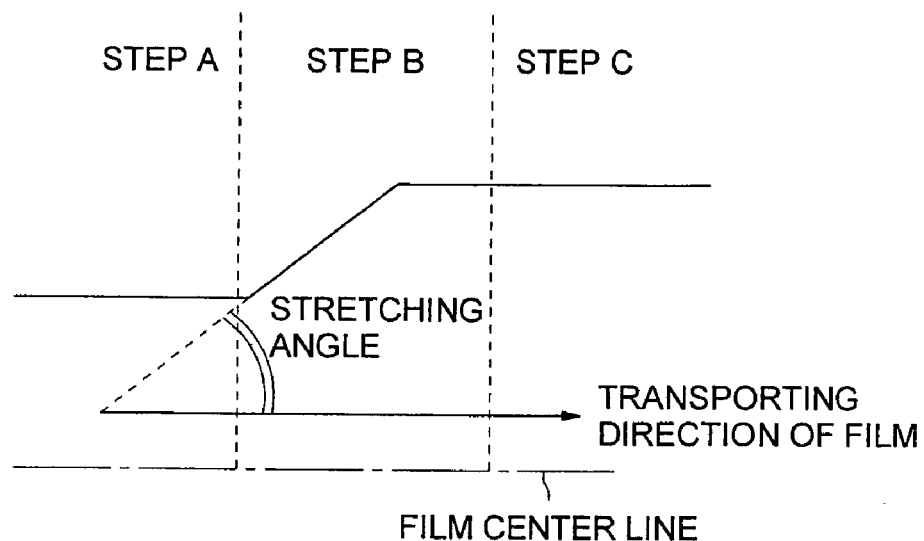
FIG. 1 shows an illustration for explaining a stretching angle at which the web is stretched in the step B.

The present invention can be attained by the following constitutions:

1. A method of manufacturing a cellulose ester film, the cellulose ester film satisfying the following formula:

$$Nx>Ny>Nz,\ 0.8 \leq R_t/R_0 \leq 3.5,\ R_0=(Nx-Ny)\times d,\ \text{and}$$

$$R_t=\{(Nx+Ny)/2-Nz\}\times d,$$

wherein Nx represents the refractive index in the transverse direction in the plane of the film, Ny represents the refractive index in the longitudinal direction in the plane of the film, Nz represents the refractive index in the thickness direction of the film, $R_0$ represents a retardation in the plane of the film, $R_t$ represents a retardation in the thickness direction of the film, and d represents the thickness (nm) of the film; the method comprising the steps of:

casting a cellulose ester dope containing a solvent of a good solvent and a poor solvent on a support to form a web;
peeling the web from the support;
transporting the peeled web (Step D0);
holding the edges in the transverse direction of the transported web (Step A);
stretching the resulting web in the transverse direction while applying a tension (Step B);
reducing the tension in the transverse direction of the web (Step C); and
drying the stretched web (Step D1),
wherein the residual solvent content of the web represented by the following formula (1) is 5 to 90% by weight at the beginning in the step A, $$\text{Residual solvent content of the web (wt \%)}=\{(M-N)/N\}\times 100 \qquad \text{formula (1)}$$

wherein M represents the weight of the web to be measured, and N represents the weight of the web after the web to have been measured is dried at 110° C. for 3 hours, and wherein the residual poor solvent content in the residual solvent content of the web represented by the following formula (2) is from 15 to 95% by weight at the terminal point in the Step D, Residual poor solvent content (%) in the residual solvent content of the web={weight of the poor solvent in the residual solvent of the web/(weight of the poor solvent in the residual organic solvent of the web+weight of the good solvent in the residual solvent of the web)}×100.    formula (2)

2. The method of item 1, wherein the transporting tension of the film in the step D0 is in the range of from 30 to 300 N/m.

3. The method of item 1, wherein the temperature of the film at the beginning of the Step B is 30 to 140° C., the temperature of the film at the terminal point of the Step B is 70 to 140° C., and the following relationship is satisfied:

$$0.4\times B0 \leq B1 \leq 0.8\times B0$$

wherein B0 (%) represents the residual solvent content of the web at the beginning of the Step B, and is 10 to 90% by weight, and B1 (%) represents the residual solvent content of the web at the terminal point of the Step B.

4. The method of item 3, wherein the residual poor solvent content in the residual solvent content of the web is from 15 to 95% by weight at the terminal point of the Step B.

5. The method of item 1, wherein the temperature of the web at the beginning of the Step B is 30 to 130° C., the temperature of the web at the terminal point of the Step B is 60 to 130° C., and the following relationship is satisfied, $$0.8\times B0 \leq B1 \leq 0.99\times B0$$

wherein B0 (%) represents the residual solvent content of the web at the beginning of the Step B, and is 10 to 90% by weight, and B1 (%) represents the residual solvent content of the web at the terminal point of the Step B.

6. The method of item 5, wherein the residual poor solvent content in the residual solvent content of the web is from 15 to 95% by weight at the terminal point of the Step B.

7. The method of item 1, wherein the ambient temperature for the web in the step B is 110 to 140° C., and the following relationship is satisfied, $$0.4\times B0 \leq B1 \leq 0.8\times B0$$

wherein B0 (%) represents the residual solvent content of the web at the beginning of the Step B, and B1 (%) represents the residual solvent content of the web at the terminal point of the Step B.

8. The method of item 7, wherein the residual poor solvent content in the residual organic solvent content of the web is from 15 to 95% by weight at the terminal point of the Step B.

9. The method of item 1, wherein the ambient temperature for the web in the step B is 30 to 130° C., and the following relationship is satisfied, $$0.8\times B0 \leq B1 \leq 0.99\times B0$$

wherein B0 (%) represents the residual solvent content of the web at the beginning of the Step B, and B1 (%) represents the residual solvent content of the web at the terminal point of the Step B.

10. The method of item 9, wherein the residual poor solvent content in the residual organic solvent content of the web is from 15 to 95% by weight at the terminal point of the Step B.

11. The method of item 1, wherein the step B is carried out at a stretching speed of from 50%/min to 500%/min, the stretching speed being represented by the following formula (3):

Stretching speed (%/min)={(web length in the transverse direction after stretching/web length in the transverse direction before stretching)−1}×100/time (min) necessary to stretch.    formula (3)

12. The method of item 1, wherein the good solvent vapor concentration of the ambient air in the steps A and B is from 2000 ppm to less than amount providing the saturated vapor pressure of the good solvent.

13. The method of item 1, wherein the stretching magnification in the step B is from 1.1 to 2.5.

14. The method of item 1, wherein drying at the step D1 is carried out under the condition of DB<DD1, wherein DB represents modulus of elasticity in the longitudinal direction of the web at the terminal point of the Step B, and DD1 represents modulus of elasticity in the longitudinal direction of the web at the beginning of the Step D1.

15. The method of item 1, wherein the edges in the transverse direction of the web are cut off with a slitter before the Step B.

16. The method of item 1, wherein a neutral zone is provided between steps A and B and/or between the steps B and C.

17. The method of item 1, wherein the cellulose ester film has a ratio Htd/Hmd falling within the range of from 0.62 to 1.0 in which Htd and Hmd represent a tear strength in the transverse direction of the film and a tear strength in the longitudinal direction of the film, respectively.

18. The method of item 1, wherein the cellulose ester film has an Std falling within the range of from −0.4 to 4.0% and an Smd falling within the range of from −0.4 to 4.0%, in which the Std and Smd represent a rate of dimensional variation in the transverse direction of the film between the films before and after having been subjected to heat and humidity treatment at 60° C. and 90% RH for 24 hours and a rate of dimensional variation in the longitudinal direction of the film between the films before and after having been subjected to heat and humidity treatment at 60° C. and 90% RH for 24 hours, respectively.

19. The method of item 1, wherein G2/G1 falls within the range of from 0.9 to 1.0, in which G1 and G2 represent the plasticizer content of the dope at the casting step, and the plasticizer content of the web at the terminal point of the Step D1, respectively.

20. The method of item 1, wherein the thickness dispersion R of the cellulose ester film falls within the range of from 0 to 8%, R being represented by formula (4):

$$R(\%)=(R\max-R\min)\times100/R\text{ave},\qquad\text{formula (4)}$$

wherein Rmax, Rmin, and Rave represent the maximum thickness in the transverse direction of the film, the minimum thickness in the transverse direction of the film, and the average thickness in the transverse direction of the film, respectively.

21. The method of item 1, wherein the dispersion of the orientation angle of the cellulose ester film falls within the direction inclined at an angle of 90°±1° to the longitudinal direction.

22. The method of item 1, wherein the coefficient of variation of the retardation in the plane ($R_0$) of the cellulose ester film is not more than 5%.

23. The method of item 1, wherein the coefficient of variation of the retardation in the thickness direction ($R_t$) of the cellulose ester film is not more than 10%.

24. The method of item 1, wherein the haze of the cellulose ester film is in the range of from 0 to 2%.

25. The method of item 1, wherein the total acyl substitution degree of the cellulose ester film is from 2.3 to 2.85, and the acetyl substitution degree of the cellulose ester film is from 1.4 to 2.85.

101. A method of manufacturing a cellulose ester film, the cellulose ester film satisfying the following formula:

$$Nx>Ny>Nz,\ 0.8\leq R_t/R_0\leq 3.5,\ R_0=(Nx-Ny)\times d,\text{ and}$$
$$R_t=\{(Nx+Ny)/2-Nz\}\times d,$$

wherein Nx represents the refractive index in the transverse direction in the plane of the film, Ny represents the refractive index in the longitudinal direction in the plane of the film, Nz represents the refractive index in the thickness direction of the film, $R_0$ represents a retardation in the plane of the film, $R_t$ represents a retardation in the thickness direction of the film, and d represents the thickness (nm) of the film; the method comprising the steps of:
casting a cellulose ester dope on a support to form a web;
peeling the web;
transporting the peeled web (Step D0);
holding the edges in the transverse direction of the web (Step A); and
stretching the held web in the transverse direction (Step B), the residual solvent content of the web represented by the following formula (1) being 5 to 90% by weight at the beginning of the stretching;

$$\text{Residual solvent content of the web}=\{(M-N)/N\}\times100\qquad\text{formula (1)}$$

wherein M represents the weight of the web when measured, and N represents the weight of the web after the web measured is dried at 110° C. for 3 hours.

102. The method of item 101, wherein the transporting tension of the web in the step D0 is in the range of from 30 to 300 N/m.

103. The method of item 102, wherein the residual poor solvent content in the residual solvent content of the web represented by the following formula (2) is from 15 to 95% by weight at the terminal point of the Step D0:

$$\begin{aligned}\text{Residual poor solvent content (\%) in the residual}\\\text{solvent content of the web}=\{\text{weight of the poor}\\\text{solvent in the residual solvent of the web}/\\\text{(weight of the poor solvent in the residual solvent of the web+weight of the good solvent in}\\\text{the residual solvent of the web)}\}\times100\qquad\text{formula (2)}\end{aligned}$$

104. A method of manufacturing a cellulose ester film, the cellulose ester film satisfying the following formula:

$$0.8\leq R_t/R_0\leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction (Step B), the temperature of the web at the beginning of the Step B being 30 to 140° C., the temperature of the web at the terminal point of the Step B being 70 to 140° C., and the following relationship being satisfied:

$$0.4\times B0\leq B1\leq 0.8\times B0$$

wherein B0 (%) represents the residual solvent content at the beginning of the Step B of the web, and is 10 to 90% by weight, and B1 (%) represents the residual solvent content at the terminal point of the Step B of the web.

105. The method of item 104, wherein the residual poor solvent content in the residual organic solvent content of the web is from 15 to 95% by weight at the terminal point of the Step B.

106. A method of manufacturing a cellulose ester film, the cellulose ester film satisfying the following formula:

$$0.8\leq R_t/R_0\leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction (Step B), the temperature of the web at the beginning of the Step B being 30 to 130° C., the temperature of the web at the terminal point of the Step B being 60 to 130° C., and the following relationship being satisfied:

$$0.8\times B0\leq B1\leq 0.99\times B0$$

wherein B0 (%) represents the residual solvent content at the beginning of the Step B, and is 10 to 90% by weight of the film, and B1 (%) represents the residual solvent content at the terminal point of the Step B of the web.

107. The method of item 106, wherein the residual poor solvent content in the residual solvent content of the web is from 15 to 95% by weight at the terminal point of the Step B.

108. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction (Step B), the ambient temperature for the web in the step B being 110 to 140° C., and the following relationship being satisfied:

$$0.4 \times B2 \leq B3 \leq 0.8 \times B2$$

wherein B2 (%) represents the residual solvent content at the beginning of the Step B of the web, and B3 (%) represents the residual solvent content at the terminal point of the Step B of the web.

109. The method of item 108, wherein the residual poor solvent content in the residual organic solvent content of the film is from 15 to 95% by weight at the terminal point of the Step B.

110. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction. (Step B), the ambient temperature for the web in the step B being 30 to 130° C., and the following relationship being satisfied:

$$0.8 \times B0 \leq B1 \leq 0.9 \times B0$$

wherein B0 (%) represents the residual solvent content at the beginning of the Step B of the web, and B3 (%) represents the residual solvent content at the terminal point of the Step B of the web.

111. The method of item 110, wherein the residual poor solvent content in the residual organic solvent content of the web is from 15 to 95% by weight at the terminal point of the Step B.

112. The method of any one of items 101 through 111, wherein the step B is carried out at a stretching speed of from 50%/min to 500%/min, the stretching speed in the transverse direction being represented by the following formula (3):

Stretching speed (%/min)={(web length in the transverse direction after stretching/web length in the transverse direction before stretching)−1}× 100/time (min) necessary to stretch.     formula (3)

113. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web;
holding the edges in the transverse direction of the peeled web (Step A);
stretching the cellulose ester film in the transverse direction (Step B); and
reducing a stretching tension (Step C),
wherein the good solvent vapor concentration of the ambient air in the steps A and B is from 2000 ppm to less than amount providing the saturated vapor pressure.

114. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web;
stretching the peeled web in the transverse direction (Step B), wherein the stretching magnification in the step B is from 1.1 to 2.5.

115. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web;
stretching the peeled web in the transverse direction (Step B);
reducing a stretching tension of the web (Step C); and
drying the film (Step D1) under the condition of DB<DD1, wherein DB represents modulus of elasticity in the longitudinal direction of the web at the terminal point of the Step B, and DD1 represents modulus of elasticity in the longitudinal direction of the web at the beginning of the Step D1.

116. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web;
stretching the peeled web in the transverse direction (Step B), wherein the edges of the web are cut off with a slitter before the Step B.

117. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:

casting a cellulose ester dope on a support to form a web;
peeling the web;
holding the edges in the transverse direction of the web (Step A);
stretching the held web in the transverse direction (Step B); and
reducing a stretching tension of the web (Step C),
wherein a neutral zone is provided between steps A and B or between the steps B and C.

118. The method of any one of items 1 through 16, manufacturing a cellulose ester film, the method comprising the steps of:
holding the edges in the transverse direction of the web (Step A);
stretching the web in the transverse direction (Step B); and
reducing a stretching tension of the web (Step C),
wherein a neutral zone is provided between steps A and B or between the steps B and C.

119. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a reducing a stretching tension of the web (Step C);
peeling the web;
stretching the peeled web in the transverse direction,
wherein Htd/Hmd is adjusted to be within the range of from 0.62 to 1.0 in which Htd and Hmd represent a tear strength in the transverse direction of the film and a tear strength in the longitudinal direction of the film, respectively.

120. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction,
wherein Std is adjusted to be within the range of from −0.4 to 4.0% and Smd to be within the range of from −0.4 to 4.0%, in which Std and Smd represent a rate of dimensional variation in the transverse direction of the film between the films before and after having been heat treated at 80° C. and 90% RH for 100 hours and a rate of dimensional variation in the longitudinal direction of the film between the films before and after having been heat treated at 80° C. and 90% RH for 100 hours, respectively.

121. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the cellulose ester film; and
stretching the peeled web in the transverse direction,
wherein G2/G1 is adjusted to be within the range of from 0.9 to 1.0, in which G1 and G2 represent the plasticizer content of the dope at the casting step, and the plasticizer content of the film at the terminal point of the Step D1, respectively.

122. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction,
wherein the thickness dispersion R is adjusted to be within the range of from 0 to 8%, R being represented by formula (4):

$$R(\%) = (Rmax - Rmin) \times 100/Rave, \quad \text{formula (4)}$$

wherein Rmax, Rmin, Rave represent the maximum thickness in the transverse direction of the film, the minimum thickness in the transverse direction of the film, and the average thickness in the transverse direction of the film, respectively.

123. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction,
wherein the dispersion of the orientation angle is adjusted to be in the direction inclined at an angle of 90°±1° to the longitudinal direction of the film.

124. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction,
wherein the dispersion of the retardation in the plane ($R_0$) of the film is adjusted to be not more than 5%.

125. A method of manufacturing a cellulose ester film, the cellulose ester film satisfying the following formula:

$$0.8 \leq R_t/R_0 \leq 3.5$$

wherein $R_0$ (nm) represents a retardation in the plane of the film, and $R_t$ (nm) represents a retardation in the thickness direction of the film; the method comprising the steps of:
casting a cellulose ester dope on a support to form a web;
peeling the web; and
stretching the peeled web in the transverse direction,
wherein the dispersion of the retardation in the thickness direction ($R_t$) of the film is adjusted to be not more than 10%.

126. The method of any one of items 101 through 125, wherein the haze of the film is adjusted to be in the range of from 0 to 2%.

127. The method of any one of items 101 through 126, wherein the total acyl substitution degree of the cellulose ester film is from 2.3 to 2.85, and the acetyl substitution degree of the cellulose ester film is from 1.4 to 2.85.

128. A cellulose ester film manufactured according to the method of any one of items 1 through 27.

129. An optical retardation film comprising the cellulose ester film of item 128.

130. An optical compensation sheet comprising the cellulose ester film of item 28 and provided thereon, an optically anisotropic layer.

131. An optical compensation sheet comprising the cellulose ester film of item 128 and an optically anisotropic layer provided on the film surface which has contacted the support at the casting step.

132. An elliptic polarizing plate comprising the cellulose ester film of item 128.

133. An elliptic polarizing apparatus comprising the elliptic polarizing plate of item 132.

134. A cellulose ester film manufactured according to a method comprising the steps of casting a cellulose ester dope on a support to form a web and peeling the web, wherein Htd/Hmd is within the range of from 0.62 to 1.0 in which Htd and Hmd represent a tear strength in the transverse direction of the film and a tear strength in the longitudinal direction of the film, respectively.

135. The cellulose ester film of item 134, wherein the cellulose ester film satisfies the following formula:

$$Nx>Ny>Nz$$

wherein Nx represents the refractive index in the transverse direction in the plane of the film, Ny represents the refractive index in the longitudinal direction in the plane of the film, and Nz represents the refractive index in the thickness direction of the film.

136. The cellulose ester film of item 134 or 135, wherein the cellulose ester film satisfies the following formula:

$$0.8 \leq R_t/R_0 \leq 3.5$$

wherein $R_0$ represents a retardation in the plane of the film, and $R_t$ represents a retardation in the thickness direction of the film.

137. The cellulose ester film of any one of items 134 through 136, wherein the total acyl substitution degree of the cellulose ester film is from 2.3 to 2.85, and the acetyl substitution degree of the cellulose ester film is from 1.4 to 2.85.

138. The cellulose ester film of any one of items 134 through 137, wherein the dispersion of the orientation angle is adjusted to be in the direction inclined at an angle of 90°±1° to the longitudinal direction of thermoplastic particles film.

139. The cellulose ester film of any one of items 134 through 138, satisfying the following relationship:

$$0(\%) \leq (Rmax - Rmin) \times 100/Rave \leq 8(\%),$$

wherein Rmax, Rmin, and Rave represent the maximum thickness in the transverse direction of the film, the minimum thickness in the transverse direction of the film, and the average thickness in the transverse direction of the film, respectively.

140. The cellulose ester film of any one of items 134 through 139, wherein the dispersion of the retardation in the plane ($R_0$) of the film is not more than 5%.

141. The cellulose ester film of any one of items 134 through 140, wherein the dispersion of the retardation in the thickness direction ($R_t$) of the film is be not more than 10%.

142. The cellulose ester film manufactured according to a method comprising the steps of casting a cellulose ester dope on a support to form a web and peeling the web, wherein Std is within the range of from −0.4 to 4.0% and Smd within the range of from −0.4 to 4.0%, in which Std and Smd represent a rate of dimensional variation in the transverse direction of the film between the films before and after having been heat treated at 80° C. and 90% RH for 100 hours and a rate of dimensional variation in the longitudinal direction of the film between the films before and after having been heat treated at 80° C. and 90% RH for 100 hours, respectively.

143. The cellulose ester film of item 142, wherein the cellulose ester film satisfies the following formula:

$$Nx>Ny>Nz$$

wherein Nx represents the refractive index in the transverse direction in the plane of the film, Ny represents the refractive index in the longitudinal direction in the plane of the film, and Nz represents the refractive index in the thickness direction of the film.

144. The cellulose ester film of item 142 or 143, wherein the cellulose ester film satisfies the following formula:

$$0.8 \leq R_t/R_0 \leq 3.5$$

wherein $R_0$ represents a retardation in the plane of the film, and $R_t$ represents a retardation in the thickness direction of the film.

145. The cellulose ester film of any one of items 142 through 144, wherein the total acyl substitution degree of the cellulose ester film is from 2.3 to 2.85, and the acetyl substitution degree of the cellulose ester film is from 1.4 to 2.85.

146. The cellulose ester film of any one of items 142 through 145, wherein the dispersion of the orientation angle is in the direction inclined at an angle of 90°±1° to the longitudinal direction of the film.

147. An optical retardation film comprising the cellulose ester film of any one of items 134 through 146.

148. An optical compensation sheet comprising the cellulose ester film of any one of items 134 through 146 and provided thereon, an optically anisotropic layer.

149. An elliptic polarizing plate comprising the cellulose ester film of any one of items 134 through 146.

150. A displaying device comprising the elliptic polarizing plate of item 149.

A solution casting film forming process relating to a method for manufacturing a cellulose ester film will be explained below.

<<Solution Casting Film Forming Process>> a) Dissolution step: The dissolution step is one in which cellulose ester (in the flake form, powdery form or granular form, or in the particles having an average particle size of preferably not less than 100 μm), or additives are dissolved, while stirring, in organic solvents mainly comprised of good solvents for the cellulose ester, employing a dissolution vessel, and thereby a dope is prepared. In order to carry out said dissolution, there are various methods such as a method in which dissolution is carried out at a normal atmospheric pressure, a method in which dissolution is carried out at a temperature lower than the boiling point of the primary solvent, a method in which dissolution is carried out at a temperature higher than the boiling point of the main solvent under an increase of pressure, a cooling dissolution method, a method in which dissolution is carried out at a high pressure, and the like. The resultant dope is filtered employing filter materials, is then defoamed, and is subsequently pumped to the next process.

The dope is a solution in which the cellulose ester and additives described later are dissolved in an organic solvent.

(Cellulose Ester)

Raw materials for the cellulose ester used in the invention are not specifically limited, and include cotton lint, tree pulp and kenaf. The cellulose ester derived from these raw materials may be used in combination in an arbitrary amount ratio.

The cellulose ester in the invention is prepared by esterifying cellulose as raw material with an acylating agent, for example, an acid anhydride (acetic anhydride, propionic anhydride, or butyric anhydride), in an organic acid such as acetic acid or in an organic solvent such as methylene chloride in the presence of a protic catalyst such as sulfuric acid or by esterifying cellulose as raw material with an acylating agent, an acid chloride (for example, $CH_3COCl$, $C_2H_5COCl$, or $C_3H_7COCl$) in the presence of a basic compound as a catalyst such as an amine. A cellulose ester can be prepared according to a method described, for example, in Japanese Patent O.P.I. Publication No. 10-45804. The cellulose ester is obtained by substituting the hydrogen of the hydroxyl group of the cellulose with an acyl group. The cellulose ester molecule is comprised of many glucose units connected, each glucose unit having three hydroxyl groups. The number of hydrogen groups of the hydroxyl group substituted by the acyl group is referred to as an acyl substitution degree. For example, cellulose triacetate is one in which all the hydrogens of the hydroxyl groups of cellulose are substituted with an acyl group.

As the cellulose ester in the invention are preferably used a cellulose ester having in addition to an acetyl group, further an propionyl group and/or a butyryl group such as cellulose acetate propionate, cellulose acetate butyrate (n-butyrate or iso-butyrate), or cellulose acetate propionate butyrate (n-butyrate or iso-butyrate). A cellulose acetate propionate having a high substitution degree of a propionate group has excellent water resistance.

The cellulose ester which can be used in the cellulose ester film of the invention is not specifically limited, but is preferably a cellulose ester satisfying the following formulae (I) and (II):

$$2.3 \leq X+Y \leq 2.85 \quad (I)$$

$$1.4 \leq X \leq 2.85 \quad (II)$$

wherein X represents an acyl substitution degree and Y represents a propionyl substitution degree and/or a butyryl substitution degree.

The cellulose ester satisfying the above two formula is suitable for the manufacture of the cellulose ester film having an excellent optical property for attaining the objects of the invention and excellent in heat resistance, which provides an optical retardation film having a positive wavelength dispersion and a good retardation. $2.5 \leq X+Y \leq 2.8$ is more preferred, and $2.6 \leq X+Y \leq 2.75$ is still more preferred, in that a cellulose ester film having a uniform optical property, particularly reduced unevenness of retardation dispersion is obtained.

The acyl substitution degree of the cellulose ester can be measured according to a method as defined in ASTM-817-96.

The number average molecular weight of the cellulose ester used in the invention is preferably 60,000 to 300,000 in that a cellulose ester film prepared therefrom has a high mechanical strength. The number average molecular weight of the cellulose ester used in the invention is more preferably 70,000 to 200,000.

The number average molecular weight of the cellulose ester can be measured according to the following method.
Solvent used: Acetone
Column used: MPW×1 (produced by Toso Co., Ltd.)
Concentration of sample: 0.2 weight/volume %
Flow rate: 1.0 ml/minute
Injection amount of sample: 300 μl
Standard sample: Polymethyl methacrylate (weight average molecular weight Mw=188,200)
Temperature: 23° C.

(Organic Solvent)

As an organic solvent, in which a cellulose ester is dissolved to prepare a cellulose ester dope, there is a chlorinated organic solvent or a non-chlorinated organic solvent. Examples of the chlorinated organic solvent include methylene chloride, which is useful for dissolution of cellulose ester, particularly cellulose triacetate. Use of the non-chlorinated organic solvent is studied in view of environmental problems. Examples of the non-chlorinated organic solvent include methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. As a dissolution method of a cellulose triacetate in these solvents, there is a method in which dissolution is carried out at ordinary temperature. However a high temperature dissolution method, a cooling dissolution method, a high pressure dissolution method is preferably used in that undissolved matter can be minimized. As a solvent for cellulose esters other cellulose triacetate, methylene chloride can be used, and methyl acetate, ethyl acetate or acetone is preferably used, and methyl acetate is more preferably used. In the invention, an organic solvent capable of dissolving the cellulose esters described above is referred to as a good solvent, and an organic solvent used in a large amount to dissolve the cellulose esters is referred to as a main organic solvent.

The dope used in the in the invention preferably contains an alcohol having 1 to 4 carbon atoms in an amount of not less than 1 to 40% by weight. When a dope employing such an alcohol is cast on a metal support, and the solvent is evaporated to form a web (a dope film), the residual alcohol content of the web increases during solvent evaporation, and the residual alcohol as a gelling agent results in gelation of the web, whereby the web formed are easily peeled from the support. An organic solvent containing such an alcohol in a small amount increases solubility of cellulose ester in an organic solvent containing no chlorine atom. The alcohols having 1 to 4 carbon atoms include methanol, ethanol, n-propanol, iso-propanol, n-butanol, sec-butanol, and tert-butanol.

Of these alcohol solvents, alcohol is preferred, which is less harmful, provides good dope stability, and has a relatively low boiling point and good drying property. These alcohol solvents alone cannot dissolve cellulose ester and therefore belong to poor solvents. In the invention, a solvent other than the good solvent described above is defined as a poor solvent.

In the invention, the good solvent refers to a solvent capable of dissolving not less than 5 g of the cellulose ester in 100 g of the solvent at 25° C., and the poor solvent refers to a solvent incapable of dissolving not less than 5 g of the cellulose ester in 100 g of the solvent at 25° C.

In the invention, the concentration of the cellulose ester in the dope is preferably 15 to 40% by weight, and the viscosity of the dope is preferably 10 to 50 Pa·s, in view of quality of the cellulose ester film surface.

The dope used in the invention may contain various materials as described below.

<Additives>

Additives such as a plasyicizer, a UV absorber, an anti-oxidizing agent, a dye or a matting agent can be added to the dope. These additives may be mixed with cellulose ester or solvents in preparing a cellulose ester dope, or may be added to the cellulose ester dope while or after the dope is prepared. The cellulose ester film for a liquid crystal display preferably contains a plasticizer, an anti-oxidizing agent or a UV absorber in that resistance to heat and humidity is secured.

<<Plasticizer>>

The dope used in the invention preferably contains a compound known as so-called "a plasticizer" in order to adjust mechanical properties, flexibility, a water absorption property, a moisture vapor transmittance rate, and a retardation of the cellulose ester film. For example, a phosphoric ester or a carboxylic acid ester is preferably used. Further, there are also preferably used a polymer prepared by polymerizing an ethylenically unsaturated monomer having a weight average molecular weight of from 500 to 10,000, an acrylic polymer, and an acrylic polymer having on the side chain an aromatic ring or a cyclohexyl ring as disclosed in Japanese Patent Application No. 2001-198450.

Examples of the phosphoric ester include triphenyl phosphate, tricresyl phosphate, and phenyldiphenyl phosphate, trioctyl phosphate, and tributyl phosphate. Examples of the carboxylic acid ester include phthalate and citrate. Examples of the phthalate include dimethyl phthalate, diethyl phthalate, dioctyl phthalate, and diethylhexyl phthalate. Examples of the citrate include triethyl acetylcitrate and tributyl acetylcitrate. Examples of other carboxylic acid esters include butyl oleate, metylacetyl ricinolate, dibutyl sebacate, and triacetin. Alkylphthalylalkyl glycolate is also preferably used. The alkyl of the alkylphthalylalkyl glycolate has a carbon atom number of preferably from 1 to 8. Examples of the alkylphthalylalkyl glycolate include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, propylphthalylethyl glycolate, methylphthalylpropyl glycolate, methylphthalylbutyl glycolate, ethylphthalybutyl glycolate, butylphthalymethyl glycolate, butylphthalyethyl glycolate, propylphthalybutyl glycolate, butylphthalypropyl glycolate, methylphthalyoctyl glycolate, ethylphthalyoctyl glycolate, octylphthalymethyl glycolate, and octylphthalyethyl glycolate. Of these alkylphthalylalkyl glycolates, methylphthalylmethyl glycolate, ethylphthalylethyl glycolate, propylphthalylpropyl glycolate, butylphthalylbutyl glycolate, and octylphthalyloctyl glycolate are preferable, and ethylphthalylethyl glycolate is more preferable.

The plasticizer content of the cellulose ester film is preferably 1 to 20% by weight based on the cellulose ester film, in realizing the effects of the invention and in preventing the plasticizer from bleeding out from the cellulose ester film. Temperature is elevated to around 200° C. while stretching or drying a cellulose ester web in the manufacture of the cellulose ester film. As a plasticizer used, a plasticizer having a vapor pressure at 200° C. of not more than 1333 Pa is preferred in minimizing bleeding out of the plasticizer from the cellulose ester film.

<<Ultraviolet Absorber>>

The UV absorbers used in the invention include an oxybenzophenone compound, a benzotriazole compound, a salicylic acid ester compound, a benzophenone compound, a cyanoacrylate compound and a nickel complex compound. The benzotriazole compound with minimized undesired coloration is preferred. The UV absorbers disclosed in Japanese Patent O.P.I. Publication Nos. 10-182621 and 8-337574 or the polymeric UV absorbers disclosed in Japanese Patent O.P.I. Publication No. 6-148430 are also preferably used.

The UV absorber in the invention is preferably a UV absorber which has an excellent absorption of ultraviolet light having a wavelength of 370 nm or less, in minimizing deterioration of a polarizing plate or a liquid crystal, and has a reduced absorption of visible light having a wavelength of 400 nm or more, in view of image displaying.

Examples of the benzotriazole compound include 2-(2'-hydroxy-5'-methylphenyl)-benzotriazole, 2-(2'-hydroxy-3', 5'-di-tert-butylphenyl)-benzotriazole, 2-(2'-hydroxy-3'-tert-butyl-5'-methylphenyl)-benzotriazole, 2-(2'-hydroxy-3',5'-di-t-butylphenyl)-5-chlorobenzotriazole, 2-(2'-hydroxy-3'-(3",4",5",6"-tetrahydrophthalimidomethyl)-5'-methylphenyl)-benzotriazole, 2,2-methylenebis(4-(1,1,3,3-tetramethylbutyl)-6-(2H-benzotriazole-2-yl)phenol), 2-(2'-hydroxy-3'-t-butyl-5'-methylphenyl)-5-chlorobenzotriazole, and a mixture of 2-(2H-benzotriazole-2-yl)-6-(straight-chained or branched dodecyl)-4-methylphenol, octyl-3-[3-t-butyl-4-hydroxy-5-(chloro-2H-benzotriazole-2-yl)phenyl] propionate and 2-ethylhexyl-3-[3-tert-butyl-4-hydroxy-5-(5-chloro-2H-benzotriazole-2-yl)phenyl]propionate, but are not limited thereto. TINUVIN 109, TINUVIN 171, and TINUVIN 326 (each produced by Ciba Specialty Co., Ltd.), which are commercially available, are preferably used.

Examples of the benzophenone compound include 2,4-dihydroxybenzophenone, 2,2'-dihydroxy-4-methoxybenzophenone, 2-hydroxy-4-methoxy-5-sulfobenzophenone, and bis (2-methoxy-4-hydroxy-5-benzoylphenylmethane), but are not limited thereto.

Of the above UV absorbers preferably used in the invention, the benzotriazole or benzophenone UV absorber is preferably used which has high transparency, and minimizes deterioration of a polarizing plate or a liquid crystal. The benzotriazole UV absorber is especially preferably used which minimizes undesired coloration. In the invention, the UV absorber is dissolved in any solvent which can dissolve the UV absorber, and the UV absorber is preferably added to a cellulose ester solution in the form of a UV absorber solution in which the UV absorber is dissolved in a good solvent such as methylene chloride, methyl acetate or dioxolane or in the form of a UV absorber solution in which the UV absorber is dissolved in a mixture solvent of a good solvent and a poor solvent such as a lower alcohol (for example, methanol, ethanol, propanol or butanol) to obtain a dope. It is preferred that the solvent composition of the UV absorber solution is the possible closest to that of the dope.

The UV absorber content of the dope is preferably 0.01 to 5% by weight, and more preferably 0.5 to 3% by weight.

<<Anti-Oxidizing Agent>>

Hindered phenol compounds are preferably used as an anti-oxidizing agent. Examples of the hindered phenol compounds include 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thiodiethylenebis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, and tris-(3,5-di-t-butyl-4-hydroxybenzyl)-isocyanurate. Of these, 2,6-di-t-butyl-p-cresol, pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate] are especially preferable. A metal-inactivating hydrazine compound such as N,N'-bis[3-(3,5-di-t-butyl-4-hydroxyphenyl)propionyl]-hydrazine or a phosphor-containing-stabilizer such as (2,4-di-t-butylphenyl)phosphite can be used in combination. The content of these compounds in the cellulose ester film is preferably 1 ppm to 1.0% by weight, and more preferably 10 to 1000 ppm by weight based on the cellulose ester weight.

<<Matting Agent>>

In the invention, a cellulose ester film containing a matting agent can provide a good transportability or an easily windable property. As a matting agent, particles with the smallest possible particle size are preferable. The matting agent particles include cross-linked polymer particles and inorganic fine particles such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate. Of these matting agents, silicon dioxide is preferable in providing a reduced haze of the cellulose ester film.

The particles such as silicon dioxide particles are often surface treated with an organic compound, and such surface treated particles are preferable in giving a reduced haze to the film. Examples of the organic compound used in the surface treatment include halogenated silanes, alkoxysilanes, silazanes, and siloxanes.

The particles having a larger average particle size have a high sliding property, and on the contrary, the particles having a smaller average particle size have a good transparency. The secondary particles of the particles have an average particle size of preferably 0.005 to 1.0 μm. The primary particles of the particles have an average particle size of preferably from 5 to 50 nm, and more preferably 7 to 14 nm. Since these particles contained in the cellulose ester film produce protrusions of 0.01 to 1.0 μm on the surface of the cellulose ester film, they are preferably used.

The particle content of the cellulose ester film is preferably from 0.005 to 0.5% by weight, and more preferably from 0.05 to 0.4% by weight, based on the cellulose ester film.

Examples of the silicon dioxide particles include, for example, Aerosil 200, 200V, 300, R972, R972V, R974, R202, R812, OX50, or TT 600 (each produced by Nihon Aerosil Co., Ltd.), and are preferably Aerosil 200V, R972, R972V, R974, R202 or R812. These particles may be used as a mixture of two or more kinds thereof. When two or more kinds of the particles are used, they may be mixed at any amount ratio. Two matting agents different in kinds or average particle size, for example, Aerosil 200V and R972 can be used in a 200V to R972 amount ratio of from 0.1:99.9 to 99.9:0.01.

When the protrusions produced by the matting agent particles inhibit orientation of an orientation layer or a liquid crystal layer, which is provided on a cellulose ester film, the cellulose ester film can be prepared so that the particles are located on only one side of the film. Coating a coating solution containing the matting agent and cellulose ester (for example, diacetyl cellulose, cellulose acetate propionate, etc.) on the cellulose ester film surface reduces a coefficient of friction of the cellulose ester film, and improves slidability of the cellulose ester film.

<<Other Additives>>

The cellulose ester film may contain thermal stabilizers such as particles of inorganic compounds including kaolin, kieselguhr, quartz, calcium carbonate, barium sulfate, titanium oxide and alumina, and salts of alkali earth metals such as calcium and magnesium. Further, an anti-static agent, a flame retarder, a sliding agent, or oil may be added to the cellulose ester film.

(b) Casting step: The casting step is one in which a dope is conveyed to a pressure die through a pressure type metering gear pump, and cast from said pressure die onto a casting site of a moving endless metal belt such as a stainless steel belt or a metal support such as a rotating metal drum. The surface of the metal support for casting is specular. There is a doctor blade method in which the thickness of the cast dope layer is controlled employing a doctor blade or a reverse roll coater method in which the thickness of the cast dope layer is controlled employing a roll rotating reversely. The pressure die is preferred in which the slit shape at the mouth piece portion can be regulated and the layer thickness is readily controlled to be uniform. Examples of the pressure die include a coat hanger die, a "T" die, and the like, and any of these is preferably employed. In order to increase the casting speed, two or more pressure dies may be provided on the metal support and dopes divided into two or more may be simultaneously cast on the metal support.

(c) Solvent evaporation step: The solvent evaporation step is one in which a web (refers to a dope layer formed after a dope is cast on a metal support) is heated on a metal support and solvents are evaporated till the web is capable of being peeled from the metal support. In order to evaporate solvents, methods include a method in which air is blown from the web side, and/or a method in which heating is carried out from the reverse surface of the support employing liquid, and a method in which heating is carried out from the surface as well as the revere surface employing heat radiation. Of these, the reverse surface liquid heating method is preferred due to high drying efficiency. Further, these methods are preferably combined.

In order to increase the film forming speed, a method is effective in which the temperature of the web on the metal support is elevated. However, the preferable drying speed is limited due to the composition of the web, since excessive heating produces forms in the web which result from the solvents contained in the web. In order to increase the film forming speed, a method is preferred in which a dope is cast on a metal belt support. When the dope is cast on a metal belt support, the casting speed is increased by lengthening the belt support. However, the increase of the belt support length tends to cause deflection due to the weight of the belt support. This deflection causes vibration of the support, resulting in ununiformity of the web thickness at the casting. Therefore, the length of the belt support is preferably 40 to 120 m.

(d) Peeling step: The peeling step is one in which a web, which has been subjected to evaporation of solvents on the support, is peeled at the peeling site. The peeled web is conveyed to the subsequent step. When the residual solvent amount (refer to the formula described below) is too excessive, it may be difficult to peel the web. On the contrary, when peeling is carried out after fully drying the web on the support, a part of the web may peel prior to the peeling site.

Listed as a method to increase the film forming speed is a gel casting method (in which peeling can be carried out even though the amount of residual solvents is relatively great). The gel casting methods include a method in which poor solvents with respect to the cellulose ester are added to a dope and gelling is carried out after casting the dope, and also a method in which gelling is carried out by decreasing the temperature of a metal support, and the like. By strengthening the web through gelling the dope on the metal support, it is possible to carry out earlier peeling and to increase the casting speed. The web on the metal support can be peeled at the time when the residual solvent amount is in the range of 5 to 150% by weight depending on the drying conditions or the length of the metal support.

It is preferred in the invention that at the peeling site on the metal support, temperature is 10 to 40° C., and preferably 15 to 35° C. It is preferred in the invention that at the peeling site on the metal support, the residual solvent content of the web is 5 to 120% by weight. In the invention, the residual solvent content is expressed employing the formula (1) described above.

When the web is formed on the belt support, increase in the film forming speed increases amplitude of vibration of the belt support. Considering the residual solvent content of the web at peeling or the length of the belt, the film forming speed is preferably 10 to 120 m/min, and more preferably 15 to 60 m/min.

In the invention, the residual solvent content through the entire width of the web is defined as an average residual solvent content. The residual solvent content occasionally refers to that at the limited web portions such as the center and the edges of the web.

(e) Drying step: The peeled web is generally dried at a drying step of drying the web employing a drying apparatus in which said web is alternatively passed through staggered rollers and/or employing a tenter apparatus in which the web is conveyed while holding both edges of the web employing clips. A common drying method is one in which both surfaces of the web are heated by heated air flow. Instead of the air flow, employed is a method in which heating is carried out employing microwaves. Too rapid drying tends to degrade the flatness of the finished film. During the entire drying step, drying temperature is commonly from 30 to 250° C. Drying temperature, drying time, and air volume for drying vary depending on employed solvents. Thus, drying conditions may be properly selected depending on types of employed solvents and their combination.

In the invention, the step D0 refers to a step of transporting the web, which has been cast on a support and peeled from the support, to a tenter section. Temperature in the step D0 is preferably controlled in order to adjust a residual solvent content of the web at stretching. The temperature in the step D0, although it varies due to the residual solvent content of the web in the step D0, is preferably 20 to 70° C., more preferably 20 to 68° C., and most preferably 20 to 40° C., in minimizing stretching of the web in the transporting direction (hereinafter referred to as the longitudinal direction) and in adjusting a residual solvent content of the web at stretching.

In the step D0, ambient temperature distribution in the direction (hereinafter referred to as the transverse direction) perpendicular to the transporting direction in the plane of the film is preferably narrow in that uniformity of the film is increased. The ambient temperature distribution in the step D0 is within the range of preferably ±5° C., more preferably ±2° C., and most preferably ±1° C. of a predetermined temperature.

As a transporting tension of the web in the step D0, the preferred range as described below exists in determining the peeling condition of the cast film from the support or in minimizing stretching in the transporting direction of the web in the step D0.

(Transporting Tension of the Web in the Step D0)

The transporting tension of the web in the step D0, although it depends on physical properties of the dope, the residual solvent content of the film at peeling or in the step D0, or temperature in the step D0, is preferably 30 to 300 N/m, more preferably 57 to 284 N/m, and most preferably 57 to 170 N/m.

A tension cutting roller is preferably provided in order to minimize elongation in the transporting direction of the web in the step D0.

The content ratio of the poor solvent to the good solvent in the web in the step D0 is preferably limited to a preferred range in order to minimize elongation in the transporting direction of the web. The poor solvent content (%) of the web at the terminal point of the step D0, which is represented by weight of poor solvent in the residual solvent of the web at the terminal point of the step D0×100 (%)/(weight of poor solvent in the residual solvent of the web at the terminal point of the step D0+weight of good solvent in the residual solvent of the web at the terminal point of the step D0), is in the range of preferably 15 to 95% by weight, more preferably 25 to 95% by weight, and most preferably 30 to 95% by weight.

(f) Stretching step (referred to also as tenter step)

Stretching step (referred to also as tenter step) in the invention will be explained below employing FIG. 2.

Figure 2:
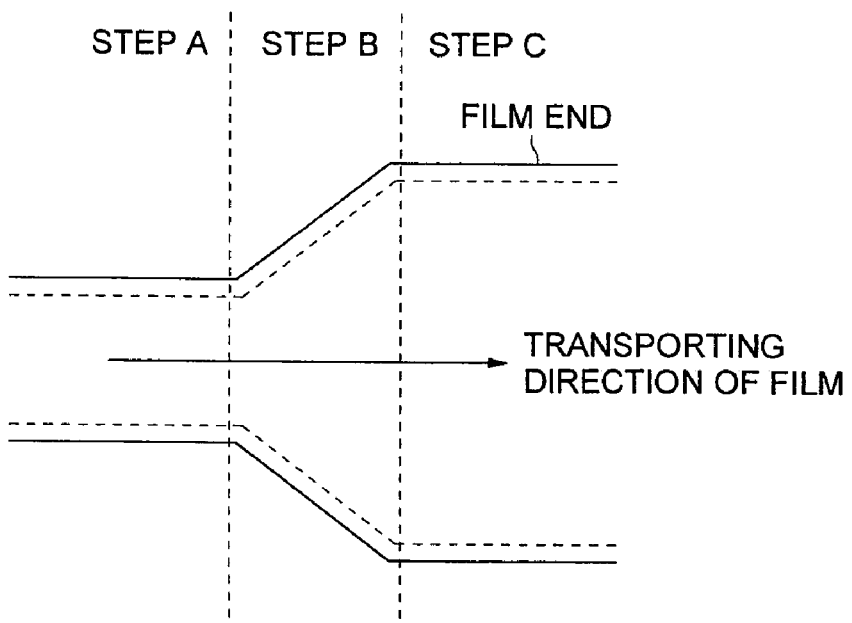
FIG. 2 shows one embodiment of a tenter step used in the invention.

In FIG. 2, a step A is a step of holding the edges in the transverse direction of the peeled web transported through the step D0 (not illustrated) of transporting the peeled web, a step B which follows is a step of stretching the web in the transverse direction (the direction perpendicular to the transporting direction of the web) preferably at a stretching angle as shown in FIG. 1 described later, and a step C which further follows is a step of reducing a tension of the stretched film after completion of the stretching.

It is preferred that a slitter for cutting off the web edges in the transverse direction is provided between the film peeling step and the beginning of the step B, and/or immediately after the step C. It is especially preferred that the slitter is provided immediately before the beginning of the step A. When stretching is carried out in the transverse direction, a film, in which the film edges have been cut off before the beginning of the step B, provides more improved orientation angle dispersion as compared with a film in which the film edges are not cut off before the beginning of the step B.

This is considered to be because unintended stretching in the longitudinal direction is minimized between the peeling step at which the film has a relatively high residual solvent and the step B.

It is also preferred that temperature sections, which have different ambient temperatures, are positively provided at the tenter step in order to improve the orientation angle dispersion. Further, it is also preferred that neutral zones are provided between the two nearest temperature sections so that the sections do not interfere with each other. (Residual solvent content at the beginning of stretching in the step B)

In the cellulose ester film manufacturing method of item 1 above, it is essential to manufacture a cellulose ester film so as to satisfy $0.8 \leq R_t/R_0 \leq 3.5$, in which $R_0$ represents a retardation in the plane of the film, and $R_t$ represents a retardation in the thickness direction of the film. In order to obtain the above range of $R_t/R_0$, the residual solvent content of the web at the beginning of the step B is 5 to 90% by weight, preferably 10 to 40% by weight, and more preferably 10 to 35% by weight.

In the cellulose ester film manufacturing method of item 3 or 5 above, it is essential to manufacture a cellulose ester film so as to satisfy $0.8 \leq R_t/R_0 \leq 3.5$, in which $R_0$ represents a retardation in the plane of the film, and $R_t$ represents a retardation in the thickness direction of the film. In order to obtain the above range of $R_t/R_0$, the residual solvent content of the web at the beginning of the step B is preferably 10 to 90% by weight, more preferably 10 to 40% by weight, and most preferably 10 to 35% by weight.

Further, in order to obtain the intended range of $R_t/R_0$ at the tenter step, a preferred good solvent ambient concentration relationship exists among the steps A, B and C. With respect to the preferred concentration relationship, Ma>Mc or Mb>Mc is preferred, wherein Ma, Mb, and Mc represent the good solvent ambient concentrations in the steps A, B, and C, respectively.

It is well known that the dispersion of an optical delayed phase axis (herein referred to also as the dispersion of an orientation angle) in the transverse direction of the film is worsened at the step of stretching the web in the direction perpendicular to the transporting direction. In order to stretch the web so as to obtain a good relationship between $R_t$ and $R_0$ and a good dispersion of the orientation angle, a preferred good solvent ambient concentration relationship exists among the steps A, B and C. When the good solvent ambient concentrations in the steps A, B, and C are Ma, Mb, and Mc, respectively, Ma is preferably more than 2000 ppm, more preferably more than 3000 ppm, and most preferably more than 60% of the good solvent saturated vapor pressure concentration, Mb is preferably more than 2000 ppm, more preferably more than 3000 ppm, and most preferably more than 60% of the good solvent saturated vapor pressure concentration, or Mc is preferably less than 60% of the good solvent saturated vapor pressure concentration, more preferably less than 3000 ppm, and most preferably less than more than 2000 ppm.

In order to stretch the web in the transverse direction so as to obtain a good relationship between $R_t$ and $R_0$ and a good dispersion of the orientation angle, a preferred range of modulus of elasticity of the web exists in the steps A, B and C. When the moduli of elasticity of the web in the steps A, B, and C are Da, Db, and Dc, respectively, preferably 100 N/mm²<|Da−Db|<2000 N/mm², more preferably 100 N/mm²<|Da−Db|<1000 N/mm², and most preferably 100 N/mm²<|Da−Db|<700 N/mm².

Further, in order to obtain an intended range of $R_t/R_0$ at the tenter step, a preferred range of modulus of elasticity of the web exists in the steps A, B and C. When the moduli of elasticity of the web in the steps A, B, and C are Da, Db, and Dc, respectively, preferably 500 N/mm²<Db<2000 N/mm², more preferably 500 N/mm²<Db<1500 N/mm², and most preferably 500 N/mm²<Db<1000 N/mm².

(Content (%) of the Poor Solvent in the Residual Solvent of the Web)

In order to obtain an intended range of $R_t/R_0$ at the tenter step, a preferred range of the content of the poor solvent or the good solvent in the residual solvent of the web exists at the terminal point of each of the steps A, B and C. The poor solvent content (%) in the residual solvent, which is represented by weight of poor solvent in the residual solvent of the web×100 (%)/(weight of poor solvent in the residual solvent of the web+weight of good solvent in the residual solvent of the web), is in the range of preferably 15 to 95% by weight, more preferably 25 to 95% by weight, and most preferably 30 to 95% by weight at each of the terminal points of the steps A, B and C. Further, the above poor solvent content may be the same or different at each of the terminal points of the steps A, B and C.

(Temperature and Residual Solvent Content of the Web at the Steps A, B and C)

It is well known that the dispersion of an optical delayed phase axis (herein referred to also as the dispersion of an orientation angle) in the transverse direction of the film is worsened at a step of stretching the web in the transverse direction. In order to stretch the web so as to obtain a good relationship between $R_t$ and $R_0$ and a good dispersion of the orientation angle, a preferred web temperature relationship exists among the steps A, B and C. When the web temperatures at the terminal points of the steps A, B, and C are Ta (°C.), Tb (°C.), and Tc (°C.), respectively, Ta≦Tb−10 or Tc≦Tb is preferable, and Ta≦Tb−10 and Tc≦Tb are more preferable.

When the web is stretched in the direction perpendicular to the transporting direction at the tenter step, in order to reduce the dispersion of the orientation angle and obtain a good range of $R_t/R_0$ at the tenter step, it is preferred that the web in a relatively soft state is stretched in the step B, and the web in the steps A and C is harder as compared with that in the step B. The above conditions can be realized controlling web temperature or the residual solvent content of the web. Ambient temperature at each step depends upon the residual solvent content of the web, but it is preferred that temperature in the step A is 30 to 40° C., and temperature in the steps B and C is 30 to 140° C. When the residual solvent content of the web at the terminal point of the step B is 0.4 to 0.8 times that of the film at the beginning of the step B, ambient temperature of the step B is preferably from 110 to 140° C. When the residual solvent content of the web at the terminal point of the step B is 0.4 to 0.8 times that of the web at the beginning of the step B, it is also preferred that ambient temperature at the beginning of the step B is from 30 to 140° C., and ambient temperature at the terminal point of the step B is from 70 to 140° C. When the residual solvent content of the web at the terminal point of the step B is 0.8 to 0.99 times that of the web at the beginning of the step B, ambient temperature of the step B is preferably from 30 to 130° C. When the residual solvent content of the web at the terminal point of the step B is 0.8 to 0.99 times that of the web at the beginning of the step B, it is also preferred that ambient temperature at the beginning of the step B is from 30 to 130° C., and ambient temperature at the terminal point of the step B is from 60 to 130° C.

In order to obtain a good dispersion of an orientation angle and a preferable range of $R_t/R_0$, the temperature elevation rate of the web in the step B is preferably 0.5 to 10° C./s.

In order to obtain a preferable range of $R_t/R_0$, stretching in the step B is preferably carried out at a short time. However, the range of time necessary to stretch the web is limited in view of uniformity of the film. The range is preferably 1 to 10 seconds, and more preferably 4 to 10 seconds.

The heat conduction coefficient at the tenter step may be constant or varied. The heat conduction coefficient is in the range of preferably from 41.9 to $419 \times 10^3$ J, more preferably from 41.9 to $209.5 \times 10^3$ J, and most preferably from 41.9 to $126 \times 10^3$ J.

In order to obtain an intended range of $R_t$ and $R_0$, the stretching rate of the web in the transverse direction in the step B may be constant or varied. The stretching rate is preferably 50 to 500%/min, more preferably 100 to 400%/min, and most preferably 200 to 300%/min.

At the tenter step, the ambient temperature distribution of the web has a preferred range, since its narrow distribution is preferable in increasing uniformity of the film. The ambient temperature distribution at the tenter step is within the range of preferably ±5° C., more preferably ±2° C., and most preferably ±1° C. of a predetermined temperature. Such a narrow temperature distribution as described above is expected to provide a narrow temperature distribution in the transverse direction of the web.

(Stretching Angle in the Preparation of Cellulose Ester Film)

The web cast on a support is stretched in the transverse direction in the step B of the cellulose ester film manufacturing method of the invention. Herein, one embodiment of the stretching step will be explained below employing FIG. 1.

The stretching angle in the step B as shown in FIG. 1 is preferably 2 to 10°, more preferably 3 to 7°, and most preferably 3 to 5°.

In order to obtain a preferred retardation in the invention, the stretching magnification at stretching the web in the transverse direction is preferably 1.1 to 2.5, more preferably 1.3 to 1.8, and most preferably 1.3 to 1.6.

When in the invention the web is stretched in the step B, a uniaxial stretching apparatus or a biaxial stretching apparatus-may be used.

In the step C, a tension in the direction perpendicular to the web transporting direction is preferably reduced in order to minimize a dimensional variation of the film. The tension is reduced so that the width of the web is preferably 95 to 99.5% of the web width in the previous step.

A drying step (hereinafter referred to also as step D1) is preferably provided after the tenter step. In order to further refine optical properties given to the cellulose ester film in the tenter step, and dry the web, the web is preferably subjected to heat treatment preferably at 50 to 140° C., more preferably at 80 to 140° C., and most preferably at 80 to 130° C.

In order to further refine optical properties given to the cellulose ester film in the tenter step and dry the web, the web is preferably subjected to heat treatment at a coefficient of heat transfer of preferably from 20.9 to $126 \times 10^3$ J/m²hr, more preferably from 41.9 to $126 \times 10^3$ J/m²hr, and most preferably from 41.9 to $83.7 \times 10^3$ J/m²hr.

(Temperature Distribution at Step D1)

In the step D1, ambient temperature in the plane and in the direction perpendicular to the transporting direction of the web is preferably narrow in that uniformity of the film is increased. The ambient temperature distribution in the step D1 is within the range of preferably ±5° C., more preferably ±2° C., and most preferably ±1° C. of a predetermined temperature.

(Transporting Tension of the Web in the Step D1)

As a transporting tension of the web in the step D1, a preferred range exists in minimizing stretching in the transporting direction of the web. The transporting tension of the web in the step D1, although it depends on physical properties of the dope, the residual solvent content of the film at peeling or in the step D1, or temperature in the step D1, is preferably 120 to 200 N/m, more preferably 140 to 200 N/m, and most preferably 140 to 160 N/m.

A tension cut roller is preferably provided in order to minimize elongation in the transporting direction of the web in the step D1. After drying, the edges in the transverse direction of the web are preferably cut off through a slitter before uptaken, in obtaining a good roll formation.

(Shear Strength in the Transverse Direction and in the Longitudinal Direction of the Cellulose Ester Film)

When the web is stretched in the transverse direction, the web is preferably stretched so that the ratio of shear strength in the transporting direction (hereinafter referred to also as MD) of the cellulose ester film and shear strength in the direction (hereinafter referred to also as TD) perpendicular to the transporting direction of the cellulose ester film falls within a certain range. When shear strength in the TD and shear strength in the MD are Htd and Hmd, respectively, the ratio Htd/Hmd satisfies preferably the first relationship 0.6<Htd/Hmd<1, more preferably the second relationship 0.783<Htd/Hmd<1, and most preferably the third relationship 0.83<Htd/Hmd<1.

(Rate of Dimensional Variation in the Transverse Direction and in the Longitudinal Direction of the Cellulose Ester Film)

When the web is stretched in the transverse direction, the web is preferably stretched so that rate of dimensional variation falls within a certain range. When rate of dimensional variation in the TD of the cellulose ester film and rate of dimensional variation in the MD of the cellulose ester film are Std and Smd, respectively, it is preferred that Std is less than 0.4% and Smd is more than −0.4%, it is more preferred that Std is less than 0.25% and Smd is more than −0.25%, and it is still more preferred that Std is less than 0.2% and Smd is more than −0.2%.

When the web is stretched in the transverse direction, the web is preferably stretched so that a rate of variation of the plasticizer or UV absorber content of the web at the completion of stretching falls within a certain range.

The rate of variation of the plasticizer or UV absorber content of the web herein referred to is represented by the following:

(Plasticizer or UV Absorber Content of the Cellulose Ester dope−plasticizer or UV absorber content of the web at the completion of stretching)×100 (%)/Plasticizer or UV absorber content of the cellulose ester dope The rate of variation of the plasticizer content of the web is preferably not more than 10%, more preferably not more than 7%, and most preferably not more than 5%. The rate of variation of the UV absorber content of the web is preferably not more than 10%, more preferably not more than 7%, and most preferably not more than 5%.

It is also preferred that G2/G1 falls within the range of from 0.9 to 1.0, in which G1 and G2 represent the plasticizer content of the dope at the casting step, and the plasticizer content of the web at the terminal point of the Step D1, respectively.

When the web is stretched in the transverse direction, the web is preferably stretched so that degree of crystallinity of the web after stretched falls within a certain range. When the web is stretched in the transverse direction, the web is preferably stretched so that concentration distribution of the plasticizer in the web after stretched falls within a certain range.

Next, the cellulose ester film manufactured according to the method as described above will be explained.

(Retardation ($R_0$, $R_t$) of Cellulose Ester Film)

In order to obtain a cellulose ester film which is employed in the optical retardation film, optical compensation sheet or elliptic polarizing plate of the invention, and which provides a liquid crystal display with a wide viewing angle, the web is stretched in the transverse direction in the manufacture of the cellulose ester film so that the ratio $R_t/R_0$ of the cellulose ester film satisfies the following formula:

$$0.8 \leq R_t/R_0 \leq 3.5$$

The ratio $R_t/R_0$ is preferably 0.8 to 3.0, and more preferably 0.8 to 2.5.

The retardation in the plane ($R_0$) of the cellulose ester film of the invention is preferably 30 to 1000 nm, more preferably 30 to 500 nm, still more preferably 30 to 150 nm, and most preferably 30 to 75 nm. The retardation in the thickness direction ($R_t$) of the cellulose ester film of the invention is preferably 30 to 1000 nm, more preferably 30 to 500 nm, and still more preferably 30 to 250 nm.

When the web is stretched in the transverse direction, the web is preferably stretched so that the orientation angle dispersion in the transverse direction of the film falls within a certain range. In the orientation angle of any point measured in the transverse direction of the film, the deviation from the average orientation angle is within the range of preferably ±2%, more preferably ±0.1%, and still more preferably ±0.5%.

(Orientation Angle)

In the invention, the orientation angle represents an angle between the delayed phase axis direction in the film plane and the transverse or longitudinal direction in the manufacturing process of the cellulose ester film according to a cast film forming method. The orientation angle is measured employing an automatic birefringence meter KOBURA-A21ADH.

As one of the reasons that disorder of the orientation angle of the cellulose ester film manufactured by stretching the web in the transverse direction occurs, it is considered that unintended stretching in the longitudinal direction of the web occurs. Where the unintended stretching in the longitudinal direction of the web occurs, the film has a retardation in the plane having a delayed phase axis in the longitudinal direction of the film and increases a retardation in the thickness direction of the film, resulting in deterioration of dispersion of the orientation angle. In order to provide a retardation in the plane having a delayed phase axis in the transverse direction of the film, the retardation in the plane having a delayed phase axis in the longitudinal direction of the film is requires to be cancelled, which results in an increases of a retardation in the thickness direction of the film. Accordingly, uniformalization of the orientation angle uniformalizes retardations both in the plane and in the thickness direction, which provides a low $R_t/R_0$.

(Dispersion of Retardation of Cellulose Ester Film)

In the invention, in the dispersion of the retardation in the plane ($R_0$) of the cellulose ester film, the cellulose ester film has a coefficient of variation of ($R_0$) of preferably not more than 5%, more preferably not more than 2%, and still more preferably not more than 1.5%. In the dispersion of the retardation in the thickness direction ($R_t$) of the cellulose ester film, the cellulose ester film has a coefficient of variation of ($R_t$) of preferably not more than 10%, more preferably not more than 2%, and still more preferably not more than 1.5%.

The value of the dispersion of the retardation as described above is represented in terms of a coefficient of variation of retardations obtained by being measured at an interval of 1 cm in the transverse direction of the film. The method of measuring the retardation and the value of the dispersion will be described later.

(Variation of Retardation Due to Different Wavelengths of Light for Measurement)

In the cellulose ester film prepared by stretching the web in the transverse direction, a smaller variation of retardation due to the different wavelengths provides a liquid crystal display panel with minimized color irregularity.

The ratios $R_{450}/R_0$ and $R_{650}/R_0$ satisfy preferably the first relationship $0.5 < R_{450}/R_0 < 1.0$ and $1.0 < R_{650}/R_0 < 1.5$, more preferably the second relationships $0.7 < R_{450}/R_0 < 0.95$ and $1.01 < R_{650}/R_0 < 1.2$, and still more preferably the third relationships $0.8 < R_{450}/R_0 < 0.93$ and $1.02 < R_{650}/R_0 < 1.1$.

(Light Transmittance of Cellulose Ester Film)

As a film for an LCD (liquid crystal display), high light transmittance and high ultraviolet ray absorption are required. The cellulose ester film, to which the additives described above are added, has a light transmittance at 500 nm of preferably from 85 to 100%, more preferably from 90 to 100%, and still more preferably from 92 to 100%. The film has a light transmittance at 400 nm of preferably from 45 to 100%, more preferably from 50 to 100%, and still more preferably from 60 to 100%. Further, the film has a light transmittance at 380 nm of preferably from 0 to 10%, more preferably from 0 to 5%, and still more preferably from 0 to 3%.

(Dispersion of Thickness in the Transverse Direction of Cellulose Ester Film)

The web is stretched in the transverse direction so that the dispersion R(%) of thickness in the transverse direction of the film satisfies preferably the first relationship $0 \leq R \leq 8$, more preferably the second relationship $0 \leq R \leq 5$, and still more preferably the third relationship $0 \leq R \leq 4$.

(Haze of Cellulose Ester Film)

As one of the reasons that an increase in haze of the cellulose ester film prepared by stretching the web in the transverse direction occurs, it is considered that unintended stretching in the longitudinal direction of the web occurs. Stretching the web so that haze of the film is reduced uniformalizes a retardation in the plane and a retardation in the thickness direction, providing a low $R_t/R_0$.

It is preferred that the cellulose ester film is stretched in the transverse direction so that the film after stretched has a haze falling within a certain range. The haze of the film is preferably not more than 2%, more preferably not more than 1.5%, and still more preferably not more than 1%.

(Coefficient of Elasticity of Cellulose Ester Film)

It is preferred that the web is stretched in the transverse direction so that the film has a tensile strength falling within a certain range.

It is preferred that the web is stretched in the transverse direction so that the film has a modulus of elasticity falling within a certain range. Modulus of elasticity in the transverse direction (TD) and modulus of elasticity in the longitudinal direction (MD) may be the same or different. In the web stretched in the transverse direction, unintended stretching in the transverse direction of the web results in change of modulus of elasticity of the film. Stretching the web so that the film has a modulus of elasticity falling within a certain range uniformalizes retardation in the plane and retardation in the thickness direction, which provides a low $R_t/R_0$.

The modulus of elasticity of the cellulose ester film is in the range of preferably from 1.5 to 5 GPa, more preferably from 1.8 to 4 GPa, and still more preferably from 1.9 to 3 GPa.

In the web stretched in the transverse direction, unintended stretching in the transverse direction results in change of fracture point stress of the film. Stretching the web so that the film has a fracture point stress falling within a certain range uniformalizes a retardation in the plane and a retardation in the thickness direction, which provides a low $R_t/R_0$. The fracture point stress in the transverse direction (TD) and the fracture point stress in the longitudinal direction (MD) may be the same or different.

The fracture point stress of the cellulose ester film is in the range of preferably from 50 to 200 MPa, more preferably from 70 to 150 MPa, and still more preferably from 80 to 100 MPa.

In the web stretched in the transverse direction, unintended stretching in the transverse direction results in change of fracture point elongation of the film. Stretching the web so that the film has a fracture point elongation falling within a certain range uniformalizes a retardation in the plane and a retardation in the thickness direction, which provides a low $R_t/R_0$. Fracture point elongation in the transverse direction (TD) and fracture point elongation in the longitudinal direction (MD) may be the same or different.

The fracture point elongation of the cellulose ester film is in the range of preferably from 20 to 80%, more preferably from 30 to 60%, and still more preferably from 40 to 50%.

In the web stretched in the transverse direction, unintended stretching in the transverse direction results in change of rate of hygroscopic swelling of the film. It is preferred that the web is stretched in the transverse direction so that the film has a rate of hygroscopic swelling falling within a certain range. Rate of hygroscopic swelling in the transverse direction (TD) and rate of hygroscopic swelling in the longitudinal direction (MD) may be the same or different.

The rate of hygroscopic swelling of the cellulose ester film is in the range of preferably from −1 to 1%, more preferably from −0.5 to 0.5%, and still more preferably from 0 to 0.2%.

In the web stretched in the transverse direction, unintended stretching in the transverse direction tends to produce luminescent foreign materials. Stretching the web so that occurrence of the luminescent foreign materials is minimized uniformalizes a retardation in the plane and a retardation in the thickness direction, which provides a low $R_t/R_0$.

The luminescent foreign materials on the cellulose ester film is in the range of preferably from 0 to 80 per $cm^2$ of the film, more preferably from 0 to 60 per $cm^2$ of the film, and still more preferably from 0 to 30 per $cm^2$ of the film.

Generally, when a cellulose ester film is used as a polarizing plate protective film, the film is subjected to alkali saponification in order to improve its adhesion to a polarizing film. After the cellulose ester film is alkali saponified, the resulting film is adhered to the polarizing film through a polyvinyl alcohol aqueous solution as an adhesive. Therefore, when a contact angle of the saponified cellulose ester film to water is high, the adhesion through the polyvinyl alcohol aqueous solution is difficult, which is problematic. The contact angle of the saponified cellulose ester film to water is in the range of preferably from 0 to 60°, more preferably from 5 to 55°, and still more preferably from 10 to 30°.

(Center-Line Average Roughness Ra of Cellulose Ester Film)

When a cellulose ester film is used as a member for an LCD, the film is required to have an excellent flatness, in order to minimize leak of light. Herein, the center-line average roughness Ra is a value defined in JIS B 0161. The measurement is carried out, for example, according to a trace method or an optical method. The center-line average roughness (Ra) of the cellulose ester film in the invention is preferably not more than 20 nm, more preferably not more than 10 nm, and still more preferably not more than 3 nm.

Next, the measuring method of various measurements with respect to the cellulose ester film in the invention and the measuring method used in examples described later will be explained.

(Poor Solvent Content in the Residual Solvent)

The residual solvent of the cellulose ester film sample was collected under reduced pressure, and solvents in the collected solvent were quantitatively analyzed according to gas chromatography.

(Modulus of Elasticity, Fracture Point Elongation, and Fracture Point Stress)

These were measured according to tensile testing as follows. The cellulose ester film containing a residual solvent was cut to a size of a width of 10 mm and a length of 200 mm, and fixed by two chucks 100 mm distant from each other at a given temperature in a methylene chloride saturated atmosphere, and then tensile testing was carried out at a tensile speed of 100 mm/min.

The cellulose ester film containing no residual solvent was cut to a size of a width of 10 mm and a length of 200 mm, and fixed by two chucks 100 mm distant from each other at a given temperature, and then tensile testing was carried out at a tensile speed of 100 mm/min.

Measurement of retardations $R_0$ and $R_e$, refractive index in the delayed phase axis direction (in the transverse direction) Nx, refractive index in the advanced phase axis direction (in the longitudinal direction) Ny, refractive index in the thickness direction Nz, and the delayed phase axis direction (orientation angle)

Measurement of the three dimensional birefringence of the cellulose ester film was made at 23° C. and 55% RH employing light with at a wavelength of 590 nm by means of an automatic birefringence meter KOBRA-21ADH (produced by Oji Keisokukiki Co., Ltd.), then the retardations $R_0$ and $R_e$ were determined, and refractive indices Nx, Ny and Nz, and the delayed phase axis direction were determined.

The orientation angle is an angle between the delayed phase axis direction in the film plane and the transverse or longitudinal direction of the film.

(Dispersion of Retardations ($R_0$ and $R_t$) and a Coefficient of Variation (CV) thereof)

Measurement of the three dimensional birefringence of the cellulose ester film was made at an interval of 1 cm in the transverse direction at 23° C. and 55% RH employing light with at a wavelength of 590 nm by means of an automatic birefringence meter KOBRA-21ADH (produced by Oji Keisokukiki Co., Ltd.) to obtain retardations in the plane and retardations in the thickness direction. The standard deviation of the resulting retardations was obtained according to a (n−1) method. In the experiments, "n" was 130 to 140. Regarding the dispersion of the retardation, a coefficient of variation (CV) of the retardation is determined which is represented by the following formula:

Coefficient of variation (CV) of the retardation=Standard deviation/Average of retardations (Wavelength Dispersion Property)

Refractive indices at wavelengths 450 nm and 650 nm in the three axis directions of the cellulose ester film were measured at 23° C. and 55% RH by means of an automatic birefringence meter KOBRA-21ADH (produced by Oji Keisokukiki Co., Ltd.) to obtain $R_{450}$ and $R_{650}$, respectively.

As the wavelength dispersion property in the invention, $R_{450}/R_0$ and $R_{650}/R_0$ were evaluated.

(Shear Strength of Dry Cellulose Ester Film)

The cellulose ester film sample was subjected to humidity conditioning at 23° C. and at 55% RH for 4 hours, and cut into a size of 50 mm×64 mm, and then the shear strength of the resulting sample was measured according to ISO 6383/2-1983.

(Rate of Dimensional Variation)

The cellulose ester film sample was subjected to humidity conditioning at 23° C. and at 55% RH for 4 hours, and two points about 10 cm distant from each other were recorded with a mark on the sample surface in each of the transverse direction and the longitudinal direction, employing a knife, and the distances L1 in both directions between the two points were measured. Thereafter, the sample was subjected to high temperature and high humidity conditioning at 60° C. and at 90% RH for 24 hours, and then again subjected to humidity conditioning at 23° C. and at 55% RH for 4 hours, and then the distances L2 in both directions between the two points were measured. The rate of dimensional variation is represented by the following formula:

Rate (%) of dimensional variation=$\{(L2-L1)/L1\}\times 100$ (Rate of Hygroscopic Swelling)

The cellulose ester film sample was subjected to humidity conditioning at 23° C. and at 55% RH for 4 hours, and two points about 20 cm distant from each other were recorded with a mark on the sample surface in each of the transverse direction and the longitudinal direction, employing a knife, and the distances L3 in both directions between the two points were measured. Thereafter, the sample was subjected to high temperature and high humidity conditioning at 60° C. and at 90% RH for 24 hours in a thermostat, and then the distances L4 in both directions between the two points were measured in not more than 2 minutes after the sample was taken out from the thermostat. The rate of hygroscopic swelling is represented by the following formula:

Rate (%) of hygroscopic swelling=$\{(L4-L3)/L4\}\times 100$ (Dispersion of Thickness)

The cellulose ester film sample was subjected to humidity conditioning at 23° C. and at 55% RH for 4 hours, and the thickness of the sample was measured at an interval of 10 mm in the transverse direction. Based on the measurements, the dispersion of thickness R (%) represented by the following formula was computed:

Dispersion of thickness $R(\%)=\{R(\max)-R(\min)\}\times 100/R(\text{ave})$ wherein R(max) represents the maximum thickness, R(min) represents the minimum thickness, and R(ave) represents the average thickness.

(Haze)

Haze of the cellulose ester film sample was measured according to JIS K-6714 employing a haze meter TYPE 1001DP (produced by Nihon Denshoku kogyo Co., Ltd., and was used as a measure of transparency.

(Measurement of Light Transmittance)

Spectral transmittances τ (λ) of the cellulose ester film sample were measured at an interval of 10 nm in the wavelength range of from 350 to 700 nm, employing a spectral photometer U-3400 (produced by Hitachi Seisakusho Co., Ltd). Light transmittance at 380 nm, 400 nm and 500 nm was computed from the resulting spectral transmittances τ (λ).

(Curl Value)

The cellulose ester film sample was stored at 25° C. and 55% RH for 3 days, and cut into a piece with a size of 2 mm (in the longitudinal direction)×50 mm (in the transverse direction). The resulting film piece was further subjected to humidity conditioning at 23±2° C. and 55% RH for 24 hours. Thereafter, curl of the resulting piece was determined employing a curvature scale. The curl value was measured according to a method A defined in JIS-K7619-1988.

The curl value was represented in terms of 1/R, in which R (m) is the radius of curvature of the circle and the unit of R is meter (m).

(Luminescent Foreign Materials)

A polarizing film was inserted between two cellulose ester film samples arranged in a crossed Nicol state to prepare a polarizing plate to prepare a polarizing plate sample. The number of luminescent foreign materials on the polarizing plate sample was counted, employing a microscope by a factor of 30. The luminescent foreign materials were observed as bright materials which when light is projected to one side of the plate sample, appears on the other side of the plate sample. The number per 250 mm² of luminescent foreign materials at ten areas of the polarizing plate sample were counted, and the number per cm² of luminescent foreign materials was determined. In the invention, luminescent foreign materials observed had a size of from 5 to 50 μm², and no luminescent foreign materials having a size exceeding 50 μm² were observed.

(Contact Angle of Saponified Cellulose Ester Film)

The cellulose ester film sample was treated with a 2.5N NaOH solution at 50° C. for 2.5 minutes, washed with pure water for 2.5 minutes, and subjected to humidity conditioning at 23° C. and 55% RH for 24 hours. Contact angle of the resulting sample to water was measured through a contact angle meter TYPE CA-D, which was produced by Kyowa Kaimen Kagaku Co., Ltd.

(Center Line Average Roughness Ra)

The center line average roughness Ra of the cellulose ester film sample was measured through a non-contact surface roughness meter WYKO NT-2000.

(Image Sharpness)

The image sharpness is defined according to JIS K-7105. The image sharpness measured at a 1 mm slit is preferably not less than 90%, more preferably not less than 95%, and still more preferably not less than 99%.

(Rate of Water Absorption)

The cellulose ester film sample was cut into a 10×10 cm$^2$ film sample, immersed in 23° C. water for 24 hours, and taken out from the water. Water on the surface of the sample was softly wiped with a filter paper. The resulting sample had a weight of W1. Subsequently, the sample was subjected to humidity conditioning at 23° C. and at 55% RH for 24 hours, and the resulting sample had a weight of W0. The rate of water absorption was obtained from the following formula:

Rate of water absorption (%)=($W1-W0$)×100/$W0$ (Rate of Water Content)

The cellulose ester film sample was cut into a 10×10 cm$^2$ film sample, subjected to humidity conditioning at 23° C. and at 80% RH for 48 hours, and the resulting sample had a weight of W3. Subsequently, the sample was dried at 120° C. for 45 minutes, and the resulting sample had a weight of W2. The rate of water content at 23° C. and at 80% RH was obtained from the following formula:

Rate of water content (%)={($W3-W2$)/$W2$}×100

(Moisture Vapor Transmittance)

Moisture vapor transmittance herein referred to is a value according to a method described in JIS Z 0208. The moisture vapor transmittance of the cellulose ester film of the invention is preferably 10 to 250 g/m$^2$·24 hours, more preferably 20 to 200 g/m$^2$·24 hours, and still more preferably 50 to 180 g/m$^2$·24 hours.

The optical retardation film (called also optical retardation plate) will be explained below.

The cellulose ester film of the invention can be used as an optical retardation film increasing a viewing angle of a liquid crystal display.

The optical compensation sheet of the invention will be explained below.

An optically anisotropic layer containing an optically anisotropic compound is provided on the cellulose ester film of the invention or on another layer provided on the cellulose ester film of the invention. Thus, the optical compensation sheet of the invention is obtained.

When an optically anisotropic layer containing an optically anisotropic compound is provided on the cellulose ester film of the invention stretched in the transverse direction, the anisotropic layer is preferably provided on the surface of the cellulose ester film on the side contacting a support for casting the cellulose ester dope in the manufacture of the film, in view of high smoothness of the film surface.

When a compound having a liquid crystal property is coated on the cellulose ester film of the invention stretched in the transverse direction to form an optically anisotropic layer, the anisotropic layer is preferably provided on the surface of the cellulose ester film opposite the side contacting a support for casting the cellulose ester dope in the manufacture of the film, in view of orientation of the compound.

The polarizing plate of the invention and the liquid crystal display of the invention employing the polarizing plate will be explained below.

A conventional polarizing film can be used as the polarizing film used in the polarizing plate of the invention. For example, a polarizing film, in which a film of a hydrophilic polymer such as polyvinyl alcohol is treated with a dichromatic dye such as iodine, and stretched, or a polarizing film, in which a plastic film such as polyvinyl chloride is subjected to orientation treatment, can be used. The thus obtained polarizing film is laminated with a cellulose ester film.

In the invention, one in which the optical compensation sheet of the invention is provided on at least one side of the polarizing film as described above is employed as the polarizing plate. When the optical compensation sheet is provided on only one side of the polarizing film, the cellulose ester film of the invention or other transparent support such as TAC (cellulose triacetate) film is provided on the other side of the polarizing film.

The cellulose ester film of the invention is preferably employed as a polarizing plate protective film. For example, a liquid crystal is coated on the cellulose ester film or on an orientation layer provided on the cellulose ester film, oriented and fixed to form an optically anisotropic layer. The cellulose ester film with the optically anisotropic layer is employed as the polarizing plate protective film, whereby a polarizing plate providing a viewing angle increasing effect can be prepared.

When the web is stretched in the transverse direction, the web is preferably stretched so that the surface energy of the web after stretched falls within a certain range.

When the web is stretched in the transverse direction, the web is preferably stretched so that the conductivity of the web after stretched falls within a certain range.

When the web is stretched in the transverse direction, the web is preferably stretched so that the curl value of the web after stretched falls within a certain range.

The curl value is preferably −20 to 20 (1/m), more preferably −15 to 15 (1/m), and still more preferably −10 to 10 (1/m) at 23° C. and 55% RH.

When the cellulose ester film is employed as a polarizing plate protective film, the rate of water absorption of the cellulose ester film is preferably 1.0 to 4.5%, in that durability of the polarizing plate is improved and a drying property is improved when the polarizing plate protective film is adhered to a polarizing film to prepare a polarizing plate.

The rate of water content of the cellulose ester film is preferably 0.5 to 4.5%, more preferably 1.5 to 3.5%, and still more preferably 1.5 to 3.0%.

Thus obtained polarizing plate may be provided on one side of a liquid crystal cell or on each side of a liquid crystal cell. When the polarizing plate is provided on only one side of a liquid crystal cell, the polarizing plate is laminated on the liquid crystal cell so that the optical compensation sheet is closer to the liquid crystal cell than the polarizing film to form the liquid crystal display of the invention.

In a liquid crystal cell for driving of a liquid crystal display, a polarizing film is ordinarily provided on each of a first substrate provided on one side of the liquid crystal cell and a second substrate provided on the other side of the liquid crystal cell. At least one optical compensation sheet may be provided between the first substrate and the liquid crystal cell and/or between the second substrate and the liquid crystal cell. In the invention, a single optical compensation sheet of the invention is preferably provided between the substrate provided on the liquid crystal cell for driving and the polarizing film on a viewer side, in order to reduce cost and effectively realize the object of the invention.

In a twisted nematic (TN) mode liquid crystal display, the optical compensation sheet of the invention is provided on a substrate of the TN mode liquid crystal cell so that the direction providing a maximum refractive index in the plane of the cellulose ester film support of the optical compensation sheet is substantially normal to the orientation direction of the substrate (or the liquid crystal closest to the substrate) of the liquid crystal cell. The direction providing a maximum refractive index in the plane of the cellulose ester film support is inclined at an angle of 90°±5°, and preferably 90° to the orientation direction of the substrate of the liquid crystal cell.

EXAMPLES

The invention will be detailed according to the following examples, but is not limited thereto. The term, "part" and "parts" represent "part by weight" and "parts by weight", respectively, unless otherwise specified.

Example 1

<<Preparation of Cellulose Ester Film 1>>

A dope and a UV absorber solution were prepared as described below, and cellulose ester film 1 was prepared employing the dope and UV absorber solution.

(Preparation of Dope)

Cellulose acetate propionate (with an acetyl substitution degree of 2.00 and a propionyl substitution degree of 0.80 and a viscosity average polymerization degree of 350) of 100 parts, 2 parts of ethylphthalylethyl glycolate, 8.5 parts of triphenyl phosphate, 290 parts of ethylene chloride, and 60 parts of ethanol were placed into a tightly sealed vessel, and gradually heated to 45° C. in 45 minutes while slowly stirred. Pressure in the vessel was 1.2 atmosphere. The resulting solution was filtered employing Azumi filter paper No. 244, produced by Azumi Roshi Co., Ltd., and allowed to stand for 24 hours to remove foams in the solution. Thus, a cellulose ester solution was prepared.

(Preparation of UV Absorber Solution)

Five parts of the cellulose acetate propionate described above, 6 parts of TINUVIN 326 (produced by Ciba Specialty Co., Ltd.), 4 parts of TINUVIN 109 (produced by Ciba Specialty Co., Ltd.), and 5 parts of TINUVIN 171 (produced by Ciba Specialty Co., Ltd.) were dissolved in a solvent of 94 parts of methylene chloride and 8 parts of ethanol. Thus, UV absorber solution was obtained.

One hundred parts of the cellulose ester solution were mixed with 2 parts of the UV absorber solution and the mixture was stirred with a static mixer to prepare a dope. The dope of 30° C. was cast at a width of 1.6 m on a stainless steel belt support, dried for 1 minute on the stainless steel whose the rear side was brought into contact with 25° C. water, and maintained for 15 seconds on the stainless steel cooled whose rear side was further brought into contact with a 15° C. chilled water to form a web. Then, the web was peeled the support.

The residual solvent content at the peeling of the web was 80% by weight. The peeled web was transported in a D0 step at a transporting tension of 100 N/m. Ethanol/(ethanol+methylene chloride) at the terminal point of the D0 step was 70% by weight.

Both edges of the peeled web were held with clips in the step A and the distance between the clips was changed by applying a tension in the transverse direction of the web at a stretching speed of 250%/min in the step B, employing a uniaxial stretching tenter. The ambient temperature was 120° C. and the stretching magnification was 1.5.

At the beginning of the stretching, the web temperature was 80° C. and the residual solvent content of the web was 25% by weight. At the terminal point of the stretching, the web temperature was 120° C., the residual solvent content of the web was of 60% of that at the beginning of the stretching, and ethanol/(ethanol+methylene chloride) was 93% by weight.

Next, in the step C, the stretched web was transported, reducing the tension to provide 98% of the web width in the step B. The ambient concentration of methylene chloride in the steps A and B was 4000 ppm. The ambient concentration of methylene chloride in the step C was not more than 60% of the saturated concentration. Subsequently, the resulting web was dried at an ambient temperature of 100° C. in the step D1. Thus, a cellulose ester film 1 was obtained.

At the terminal point of the step B, the coefficient of elasticity of the web was 600 N/mm$^2$, and at the beginning of the step D1, the coefficient of elasticity of the web was 2000 N/mm$^2$.

The resulting cellulose ester film was wound around a core of a glass fiber reinforced resin with a diameter of 200 mm according to a taper tension method to form a film roll having a width of 1 m and a length of 1000 m. In this step, a 250° C. embossing ring was applied to the edges of the film for a knurling treatment in order to prevent film adherence in the roll film.

A cellulose ester film sample was taken from the resulting film roll, and in the central portion of the sample, the refractive index Nx in the transverse direction, the refractive index Ny in the longitudinal direction, and the refractive index Nz in the thickness direction were measured. Nx, Ny, and Nz were 1.47783, 1.47703, and 1.47613, respectively. The thickness of the sample was 80 μm.

Further, the optical properties were computed.

$Nx-Ny=0.0008$ $(Nx+Ny)/2-Nz=0.0013$ $R_0=64$ nm
$R_t=104$ nm $R_t/R_0=1.63$

Dispersion of $R_0=1.4\%$
Dispersion of $R_t=1.6\%$

The central portion of the sample had a haze of 0.1%.

As is apparent from the above, cellulose ester film 1 has excellent optical properties as an optical retardation film, or an optical compensation sheet.

Example 2

<<Preparation of Cellulose Ester Film 2>>

In the same manner as in Example 1, the dope was cast on a stainless steel belt support to form a web, and the web was peeled. The residual solvent content at the peeling of the web was 90% by weight. The peeled web was transported in the D0 step at a transporting tension of 100 N/m. Ethanol/(ethanol+methylene chloride) at the terminal point of the D0 step was 62% by weight.

Both edges of the peeled web were held with clips in the step A and the distance between the clips was changed by applying a tension in the transverse direction of the web at a stretching speed of 250%/min in the step B, employing a uniaxial stretching tenter. The ambient temperature was 170° C. and the stretching magnification was 1.5.

At the beginning of the stretching, the web temperature was 80° C. and the residual solvent content of the web was 30% by weight. At the terminal point of the stretching, the web temperature was 100° C., the residual solvent content of the web was of 90% of that at the beginning of the stretching, and ethanol/(ethanol+methylene chloride) was 66% by weight.

Next, in the step C, the stretched web was transported, reducing the tension to provide 98% of the web width in the step B. The ambient concentration of methylene chloride in the steps A and B was 4000 ppm. The ambient concentration of methylene chloride in the step C was not more than 60% of the saturated concentration. Subsequently, the resulting web was dried at an ambient temperature of 100° C. in the step D1. Thus, a cellulose ester film 2 was obtained.

At the terminal point of the step B, the coefficient of elasticity of the web was 500 N/mm$^2$, and at the beginning of the step D1, the coefficient of elasticity of the web was 1800 N/mm$^2$.

The resulting cellulose ester film was wound around a core of a glass fiber reinforced resin with a diameter of 200 mm according to a taper tension method to form a film roll having a width of 1 m and a length of 1000 m. In this step, a 250° C. embossing ring was applied to the edges of the film for a knurling treatment to form protrusions with a height of about 10 μm in order to prevent film adherence in the roll film.

A cellulose ester film sample was taken from the resulting film roll, and in the central portion of the sample, the refractive index Nx in the transverse direction, the refractive index Ny in the longitudinal direction, and the refractive index Nz in the thickness direction were measured. Nx, Ny, and Nz were 1.47790, 1.47710, and 1.47600, respectively. The thickness of the sample was 80 μm.

Further, the optical properties were computed.

$Nx-Ny=0.0008$ $(Nx+Ny)/2-Nz=0.0015$ $R_0$=64 nm
$R_t$=120 nm $R_t/R_0$=1.88

Dispersion of $R_0$=1.3%
Dispersion of $R_t$=1.4%

The delayed phase axis direction of the sample was within the range of ±0.4 degree to the transverse direction of the film. The central portion of the sample had a haze of 0.1%.

As is apparent from the above, cellulose ester film 2 has excellent optical properties as an optical retardation film, or an optical compensation sheet.

Example 3

<<Preparation of Cellulose Ester Film 3 (Comparative)>>

In the same manner as in Example 1, the dope was cast on a stainless steel belt support to form a web, and the web was peeled. The residual solvent content at the peeling of the web was 90% by weight. The peeled web was transported in the D0 step at a transporting tension of 100 N/m. Ethanol/(ethanol+methylene chloride) at the terminal point of the D0 step was 95% by weight.

Both edges of the peeled cellulose ester film were held with clips in the step A and the distance between the clips was changed by applying a tension in the transverse direction of the web at a stretching speed of 250%/min in the step B, employing a uniaxial stretching tenter. The ambient temperature was 170° C. and the stretching magnification was 1.5.

At the beginning of the stretching, the web temperature was 150° C. and the residual solvent content of the web was 4% by weight. At the terminal point of the stretching, the web temperature was 170° C., the residual solvent content of the web was of 30% of that at the beginning of the stretching, and ethanol/(ethanol+methylene chloride) was 98% by weight.

The ambient concentration of methylene chloride in the steps A and B was 4000 ppm. Next, the stretched web was transported and then dried at an ambient temperature of 100° C. in the step D1. Thus, comparative cellulose ester film 3 was obtained. In the step B, the coefficient of elasticity of the web was 1500 N/mm$^2$, and in the step D1, the coefficient of elasticity of the film was 2000 N/mm$^2$.

The resulting cellulose ester film was wound around a core of a glass fiber reinforced resin with a diameter of 200 mm according to a taper tension method to form a film roll having a width of 1 m and a length of 1000 m. In this step, a 250° C. embossing ring was applied to the edges of the film for a knurling treatment in order to prevent film adherence in the roll film.

A cellulose ester film sample was taken from the resulting film roll, and in the central portion of the sample, the refractive index Nx in the transverse direction, the refractive index Ny in the longitudinal direction, and the refractive index Nz in the thickness direction were measured. Nx, Ny, and Nz were 1.47792, 1.47742, and 1.47567, respectively. The thickness of the sample was 80 μm. From these values, Nx−Ny, (Nx+Ny)/2−Nz, $R_0$, and $R_t$ were computed as 0.0005, 0.002, 40.0 nm, and 160.0 nm, respectively.

$R_t$ is far higher than $R_0$, which is problematic for an optical retardation film. Further, the delayed phase axis direction of the sample exceeds ±0.2 degree to the transverse direction of the film.

Further, the other optical properties of the comparative cellulose ester film sample 3 are collectively shown below.

| | |
|---|---|
| Dispersion of a retardation in the plane $R_0$ | 5.1% |
| Dispersion of a retardation in the thickness direction $R_t$ | 11.2% |
| Average thickness R(ave) | 80 μm |
| Maximum thickness R(max) | 83.4 μm |
| Minimum thickness R(min) | 76.1 μm |
| Dispersion R of thickness | 9.1% |
| Light transmittance (500 nm) | 80% |
| Light transmittance (400 nm) | 78% |
| Light transmittance (380 nm) | 12% |
| Haze | 2.1% |
| Center line average roughness Ra | 21.1 nm |
| Rate of dimensional variation (Smd) | −0.41% |
| Rate of dimensional variation (Std) | −0.51% |
| Rate of hygroscopic swelling (MD) | 1.2% |
| Rate of hygroscopic swelling (TD) | 2.3% |
| Shear strength (MD) | 2.2 N/μm |
| Shear strength (TD) | 1.2 N/μm |
| Htd/Hmd | 0.6 |
| Fracture point stress (MD) | 45 MPa |

-continued

| Fracture point stress (TD) | 32 MPa |
|---|---|
| Fracture point elongation (MD) | 15% |
| Fracture point elongation (TD) | 12% |
| Modulus of elasticity (MD) | 1.4 GPa |
| Modulus of elasticity (TD) | 1.3 GPa |
| Curl (23° C., 55% RH) | 45 m$^{-1}$ |
| Luminescent foreign materials | 85/cm$^2$ |
| Plasticizer content ratio G2/G1 | 0.88 |
| Contact angle of the saponified film | 65° |

Example 4

<<Preparation of Cellulose Ester Films 4 through 9>>

Cellulose ester films 4 through 9 were prepared in the same manner as in Example 1, except that cellulose acetate propionate with an acetyl substitution degree of 1.8 and a propionyl substitution on degree of 0.80 was used and the ratio Htd/Hmd, the ratio of shear strength in the transverse direction of the film to shear strength in the longitudinal direction of the film was adjusted as shown in Table 1.

A retardation in the plane $R_0$ and a retardation in the thickness direction $R_t$ of the resulting film were determined, and the ration $R_t/R_o$ were computed. The results are shown in Table 1.

TABLE 1

| Cellulose ester film | Htd/Hmd | $R_t/R_o$ |
|---|---|---|
| 4 | 0.59 | 3.8 |
| 5 | 0.62 | 2.0 |
| 6 | 0.78 | 2.0 |
| 7 | 0.83 | 1.2 |
| 8 | 1.0 | 1.5 |
| 9 | 1.1 | 3.6 |

As is apparent from Table 1 above, cellulose ester films 5 through 8 having a tear strength ratio $H_{td}/H_{md}$ of from 0.62 to 1.0 have excellent optical properties as an optical retardation film, or an optical compensation sheet.

Example 5

<<Preparation of Cellulose Ester Films 10 through 18>>

Cellulose ester films 10 through 18 were prepared in the same manner as in Example 1, except that cellulose acetate propionate with an acetyl substitution degree of 2.00 and a propionyl substitution degree of 0.7 was used and the film were stretched in the transverse direction to give a rate of dimensional variation in the transverse direction Std (%) and a rate of dimensional variation in the longitudinal direction Smd (%) as shown in Table 2.

Further, the ratio $R_t/R_0$ of the resulting film was computed. The results are shown in Table 2.

TABLE 2

| Cellulose ester film | Smd (%) | Std (%) | $R_t/R_0$ |
|---|---|---|---|
| 10 | −0.01 | −0.02 | 1.1 |
| 11 | 0.2 | −0.01 | 1.5 |
| 12 | 0.2 | 0.15 | 1.6 |
| 13 | −0.2 | −0.25 | 1.5 |
| 14 | −0.32 | −0.28 | 1.9 |
| 15 | −0.27 | −0.32 | 1.9 |

TABLE 2-continued

| Cellulose ester film | Smd (%) | Std (%) | $R_t/R_0$ |
|---|---|---|---|
| 16 | 0.32 | 0.28 | 1.9 |
| 17 | 0.41 | −0.20 | 3.1 |
| 18 | −0.19 | 0.42 | 3.2 |

As in apparent from Table 2 above, cellulose ester films 11 through 16 prepared by stretching so as to have an Smd falling within the range of from −0.4 to 0.4% and an Std falling within the range of from −0.4 to 0.4% have excellent optical properties as an optical retardation film or an optical compensation sheet.

Example 6

<<Preparation of Cellulose Ester Films 19 through 23>>

Cellulose ester films 19 through 23 were prepared in the same manner as in Example 1, except that cellulose acetate propionate with an acetyl substitution degree of 1.9 and a propionyl substitution degree of 0.7 was used and the film were stretched in the transverse direction to give a dispersion R of thickness in the transverse direction of the film as shown in Table 3.

Further, the ratio $R_t/R_0$ of the resulting film was computed. The results are shown in Table 3.

TABLE 3

| Cellulose ester film | R (%) | $R_t/R_0$ |
|---|---|---|
| 19 | 3.5 | 1.1 |
| 20 | 4.0 | 1.5 |
| 21 | 5.0 | 2.2 |
| 22 | 8.0 | 2.8 |
| 23 | 8.5 | 3.5 |

As is apparent from Table 3 above, cellulose ester films 19 through 23, prepared by stretching so as to have a dispersion R of thickness falling within the range of from 0 to 8%, have excellent optical properties as an optical retardation film or an optical compensation sheet.

Example 7

<<Preparation of Polarizing Plate>>

(Preparation of Elliptic Polarizing Plate A for Viewing Angle Compensation)

A triacetyl cellulose film with a thickness of 80 μm (produced by Konica Corporation) was immersed in an aqueous 2 mole/liter sodium hydroxide solution at 60° C. for 2 minutes, and dried at 100° C. for 10 minutes. Thus, a triacetyl cellulose support subjected to alkali saponification was obtained.

A 120 μm thick polyvinyl alcohol film was immersed in an aqueous solution comprised of 1 part by weight of iodine, 4 parts by weight of boric acid and 100 parts by weight of water, and stretched at 50° C. by a factor of 4 to obtain a polarizing film (polarizer 1).

The triacetyl cellulose support obtained above was adhered, through a 5% completely saponified polyvinyl alcohol aqueous solution as an adhesive, to each side of the above obtained polarizer 1. Thus, polarizing plate 1 was prepared.

<Preparation of Oriented film A-2>

A gelatin layer (having a thickness of 0.1 μm) was coated on one side of the above polarizer 1, and a solution, in which 1.5% of alkyl modified polyvinyl alcohol having the following chemical structure was dissolved in a mixture solvent of methanol/water (=1:3), was coated on the gelatin layer, employing a wire bar #3, and dried at 65° C. employing hot air. Then the resulting alkyl modified polyvinyl alcohol layer was subjected to a rubbing treatment, so that the rubbing direction was parallel with the direction of the absorption axis of the polarizing plate, to form an orientation layer. Thus, polarizing plate 1a was obtained.

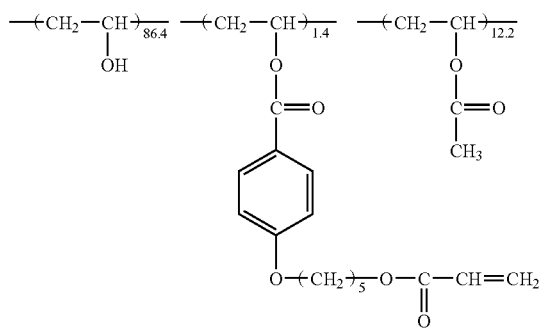

A solution LC-1 described below was coated on the orientation layer of the polarizing plate 1a above employing a wire bar #6, dried at 55° C. for 30 seconds, heated at 100° C. for 30 seconds, gradually cooled, nitrogen purged at 98 kPa for 60 seconds, and hardened with ultraviolet light of 450 mJ under an oxygen concentration of 0.1% to form a hardened layer. Thus, polarizing plate 1b having one optically anisotropic layer, in which orientation of the liquid crystal compounds was fixed, was obtained.

Next, the cellulose ester film 1 prepared in Example 1 was laminated on the optically anisotropic layer of the polarizing plate 1b obtained above through an adhesive SK Dain 2092 so that the direction of the transmission axis of the polarizer was in accordance with that providing a maximum refractive index of the cellulose ester film 1. Thus, an elliptic polarizing plate A for viewing angle compensation was obtained.

| (Composition of solution LC-1) | |
|---|---|
| MEK (methylethyl ketone) | 86 parts |
| Compound 2 | 3 parts |
| Compound 3 | 2 parts |
| Compound 4 | 3 parts |
| Compound 5 | 3 parts |
| Ilugacure 369 (produced by Ciba Specialty Chemicals Co., Ltd.) | 1 part |

Compound 2

$CH_2=CH-\overset{O}{\underset{\|}{C}}-O-(CH_2)_6-\overset{O}{\underset{\|}{C}}-O-\bigcirc-\bigcirc-\bigcirc-\bigcirc-O-\overset{O}{\underset{\|}{C}}-\bigcirc-(CH_2)_4-CH_3$ Compound 3

$CH_2=CH-\overset{}{\underset{\underset{O}{\|}}{C}}-O-(CH_2)_6-\overset{O}{\underset{\|}{C}}-O-\bigcirc-\bigcirc-C\equiv C-\bigcirc-O-(CH_2)_4-O-\overset{}{\underset{\underset{O}{\|}}{C}}-CH=CH_2$ Compound 4

$CH_2=CH-\overset{}{\underset{\underset{O}{\|}}{C}}-O-(CH_2)_8-\bigcirc-CH=CH-\bigcirc-O-(CH_2)_2-O-\overset{}{\underset{\underset{O}{\|}}{C}}-CH=CH_2$ Compound 5

$CH_2=CH-\overset{O}{\underset{\|}{C}}-O-(CH_2)_6-O-\overset{O}{\underset{\|}{C}}-CH=CH_2$ <<Evaluation of Elliptic Polarizing Plate A for Viewing Angle Compensation)

The optical compensation sheet and polarizing plate of the liquid crystal panel of a 15 TYPE liquid crystal display Multi Sync LCD1525J, produced by NEC Co., Ldt., were peeled from the liquid crystal cell, and the elliptic polarizing plate A was laminated thereto so that the absorption axis of the elliptic polarizing plate A was in accordance with that of the polarizing plate before being peeled. Thus, a liquid crystal panel sample was obtained.

The viewing angle of the resulting sample was measured employing an EZ-Contrast produced by ELDIM Co., Ltd. The viewing angle was represented by a range of an angle inclined to the direction normal to the plane of the liquid crystal panel showing a contrast ratio during white/black display of 10 or more and showing image reversal.

The inventive samples exhibited a greatly increased viewing angle.

Example 8

<<Preparation of Cellulose Ester Film 24>>

In the same manner as in Example 1, the dope was cast on a stainless steel belt support to form a web, and the web was peeled. The residual solvent content at the peeling of the web was 90% by weight. The peeled web was transported in the DO step at a transporting tension of 150 N/m. Ethanol/(ethanol+methylene chloride) at the terminal point of the DO step was 30% by weight.

Both edges of the peeled web were cut off with a slitter by a 10 cm width and held with clips in the step A, employing a uniaxial stretching tenter.

Then, the distance between the clips was changed by applying a tension in the transverse direction of the web at a stretching speed of 130%/min in the step B. The ambient temperature was 110° C. and the stretching magnification was 1.4. At the beginning of the stretching, the web temperature was 60° C. and the residual solvent content of the web was 20% by weight. At the terminal point of the stretching, the web temperature was 100° C., the residual solvent content of the web was of 90% of that at the beginning of the stretching, and ethanol/(ethanol+methylene chloride) was 93% by weight.

Next, in the step C, the web was transported, reducing the tension so as to provide 97% of the web width in the step B. The ambient concentration of methylene chloride in the steps A and B was 2000 ppm. The ambient concentration of methylene chloride in the step C was not more than 60% of the saturated concentration.

A neutral zone was provided between the steps A and B and between the steps B and C in order to prevent the temperatures of the different steps from interfering with each other.

Subsequently, the resulting web was dried at an ambient temperature of 100° C. in the step D1. Thus, a cellulose ester film 24 was obtained.

At the terminal point of the step B, the coefficient of elasticity of the web was 550 N/mm$^2$, and at the beginning of the step D1, the coefficient of elasticity of the web was 1800 N/mm$^2$.

The resulting cellulose ester film 24 was wound around a core of a glass fiber reinforced resin with a diameter of 200 mm according to a taper tension method to form a film roll having a width of 1 m and a length of 1000 m. In this step, a 250° C. embossing ring was applied to the edges of the film for a knurling treatment to form protrusions with a height of about 10 μm in order to prevent film adherence in the roll film.

Optical properties of the cellulose ester film 24 are collectively shown below.

| | |
|---|---|
| Nx | 1.4778 |
| Ny | 1.4772 |
| Nz | 1.4760 |
| $R_0$ | 50 nm |
| $R_t$ | 120 nm |
| $R_t/R_0$ | 2.4 |
| $R_{450}/R_0$ | 0.88 |
| $R_{650}/R_0$ | 1.03 |
| Dispersion of orientation angle | within the range of ±0.5° |
| Dispersion of a retardation $R_0$ | 1% |
| Dispersion of a retardation $R_t$ | 1.4% |
| Average thickness R(ave) | 80.0 μm |
| Maximum thickness R(max) | 80.5 μm |
| Minimum thickness R(min) | 79.5 μm |
| Dispersion R of thickness | 1.3% |
| Light transmittance (500 nm) | 92.2% |
| Light transmittance (400 nm) | 58.2% |
| Light transmittance (380 nm) | 2.3% |
| Haze | 0.1% |
| Center line average roughness Ra | 1.65 nm |
| Rate of dimensional variation (Smd) | −0.05% |
| Rate of dimensional variation (Std) | −0.03% |
| Rate of hygroscopic swelling (MD) | 0.1% |
| Rate of hygroscopic swelling (TD) | 0.07% |
| *-continued* | |
| Shear strength (MD) | 2.3 N/μm |
| Shear strength (TD) | 2.0 N/μm |
| Fracture point stress (MD) | 93 MPa |
| Fracture point stress (TD) | 87 MPa |
| Fracture point elongation (MD) | 40% |
| Fracture point elongation (TD) | 45% |
| Modulus of elasticity (MD) | 2.8 GPa |
| Modulus of elasticity (TD) | 3.0 GPa |
| Curl (23° C., 55% RH) | 8 m$^{-1}$ |
| Luminescent foreign materials | 21/cm$^2$ |
| Plasticizer content ratio G2/G1 | 0.99 |
| Contact angle of the saponified film | 17° |

As is apparent from the above, cellulose ester film 24 has excellent optical properties as an optical retardation film or an optical compensation sheet.

A viewing angle compensation elliptic polarizing plate was prepared in the same manner as in Example 7, except that the cellulose ester film 24 was used instead of the cellulose ester film 1, and was evaluated for viewing angle in the same manner as in Example 7. As a result, the polarizing plate obtained above exhibited greatly improved viewing angle as compared with the optical compensation sheet and polarizing plate used in the liquid crystal panel of Multi Sync LCD 1525J.

Example 9

A polarizer 1 was prepared in the same manner as in Example 7. The cellulose ester film 24 prepared in Example 8 was immersed in an aqueous 2 mole/liter sodium hydroxide solution at 60° C. for 2 minutes, and dried at 100° C. for 10 minutes. Thus, a transparent support B subjected to alkali saponification was obtained.

A gelatin layer (having a thickness of 0.1 μm) was coated on the surface of the transparent support B opposite the side contacting the belt support at the casting of the cellulose ester dope in the manufacture of the cellulose ester film. A solution, in which 1.5% of the alkyl modified polyvinyl alcohol described above was dissolved in a mixture solvent of methanol/water (=1:3), was coated on the gelatin layer, employing a wire bar #3, and dried at 65° C. employing hot air. Then, the resulting alkyl modified polyvinyl alcohol coat layer was subjected to a rubbing treatment to form an orientation layer. Herein, the rubbing treatment was carried out so that the rubbing direction was parallel with the longitudinal direction of the cellulose ester film.

The solution LC-1 described previously was coated on the orientation layer above employing a wire bar #6, dried at 55° C. for 30 seconds, heated at 100° C. for 30 seconds, gradually cooled, nitrogen purged at 98 kPa for 60 seconds, and hardened with ultraviolet light of 450 mJ under an oxygen concentration of 0.1% to form a hardened layer. Thus, an optical compensation sheet C having an optically anisotropic layer containing the liquid crystal compounds, in which orientation of the liquid crystal compounds was fixed, was obtained.

Next, the polarizer 1 obtained above was laminated on the optically anisotropic layer of the optical compensation sheet C through an adhesive SK Dain 2092 so that the direction of the transmission axis of the polarizer was in accordance with that of the delayed phase axis of the transparent support B. Thus, an elliptic polarizing plate D for viewing angle compensation was obtained.

The resulting viewing angle compensation elliptic polarizing plate D was evaluated for viewing angle in the same manner as in Example 7. As a result, the polarizing plate D obtained above exhibited a greatly improved viewing angle property.

Example 10

An elliptic polarizing plate E for viewing angle compensation was prepared in the same manner as in Example 9, except that a gelatin layer (having a thickness of 0.1 μm) was coated on the surface of the transparent support B, the surface contacting the belt support at casting of the cellulose ester dope in the manufacture of the cellulose ester film. The resulting elliptic polarizing plate E for viewing angle compensation was evaluated for viewing angle in the same manner as in Example 7. As a result, the polarizing plate E obtained above exhibited a greatly improved viewing angle property.

Example 11

<<Preparation of Cellulose Ester Film 25>>

Cellulose ester film 25 was prepared in the same manner as in Example 8, except that cellulose acetate propionate with an acetyl substitution degree of 1.9 and a propionyl substitution degree of 0.75 was used instead of the cellulose acetate propionate used in Example 1.

Optical properties of the cellulose ester film 25 are collectively shown below.

| | |
|---|---|
| $N_x$ | 1.4781 |
| $N_y$ | 1.4772 |
| $N_z$ | 1.4758 |
| $R_0$ | 70 nm |
| $R_t$ | 150 nm |
| $R_t/R_0$ | 2.1 |
| $R_{450}/R_0$ | 0.91 |
| $R_{650}/R_0$ | 1.04 |
| Dispersion of orientation angle | within the range of ±0.5° |
| Dispersion of a retardation $R_0$ | 1.2% |
| Dispersion of a retardation $R_t$ | 1.5% |
| Average thickness R(ave) | 80.0 μm |
| Maximum thickness R(max) | 80.6 μm |
| Minimum thickness R(min) | 79.4 μm |
| Dispersion R of thickness | 1.5% |
| Light transmittance (500 nm) | 92.1% |
| Light transmittance (400 nm) | 58.4% |
| Light transmittance (380 nm) | 2.3% |
| Haze | 0.1% |
| Center line average roughness Ra | 1.66 nm |
| Rate of dimensional variation (Smd) | −0.05% |
| Rate of dimensional variation (Std) | −0.08% |
| Rate of hygroscopic swelling (MD) | 0.1% |
| Rate of hygroscopic swelling (TD) | 0.07% |
| Shear strength (MD) | 2.3 N/μm |
| Shear strength (TD) | 2.0 N/μm |
| Fracture point stress (MD) | 91 MPa |
| Fracture point stress (TD) | 87 MPa |
| Fracture point elongation (MD) | 39% |
| Fracture point elongation (TD) | 45% |
| Modulus of elasticity (MD) | 2.8 GPa |
| Modulus of elasticity (TD) | 3.0 GPa |
| Curl (23° C., 55% RH) | 8 m$^{-1}$ |
| Luminescent foreign materials | 23/cm$^2$ |
| Plasticizer content ratio G2/G1 | 0.99 |
| Contact angle of the saponified film | 18° |

As is apparent from the above, cellulose ester film 25 has excellent optical properties as an optical retardation film or an optical compensation sheet.

EFFECTS OF THE INVENTION

The present invention can provide a manufacturing method of a cellulose ester film having excellent optical properties, and the cellulose ester film manufactured according to the method, and further provide an optical retardation film, an elliptic polarizing plate, an optical compensation sheet and an image display each employing the cellulose ester film.

What is claimed is:

1. A cellulose ester film manufactured according to a method comprising the steps of:

casting a cellulose ester dope on a support to form a web; and peeling the web, wherein the cellulose ester film satisfies the following formula:

$$Nx > Ny > Nz$$

wherein Nx represents the refractive index in the transverse direction in the plane of the film, Ny represents the refractive index in the longitudinal direction in the plane of the film, and Nz represents the refractive index in the thickness direction of the film, wherein Htd/Hmd is within the range of from 0.62 to 1.0 in which Htd and Hmd represent a tear strength in the transverse direction of the film and a tear strength in the longitudinal direction of the film, respectively, and wherein the dispersion of the orientation angle of the cellulose ester film fall within a direction inclined at an angle of 90°±1° to the longitudinal direction of the film.

2. The cellulose ester film of claim 1, wherein the cellulose ester film satisfies the following formula:

$$0.8 \leq R_t/R_0 \leq 3.5$$

wherein $R_0$ represents a retardation in the plane of the film, and $R_t$ represents a retardation in the thickness direction of the film.

3. The cellulose ester film of claim 1, wherein the total acyl substitution degree of the cellulose ester film is from 2.3 to 2.85, and the acetyl substitution degree of the cellulose ester film is from 1.4 to 2.35.

4. The cellulose ester film of claim 1, further satisfying the following relationship:

$$0(\%) \leq (Rmax - Rmin) \times 100/Rave \leq 8 (\%),$$

wherein Rmax, Rmin, and Rave represent the maximum thickness in the transverse direction of the film, the minimum thickness in the transverse direction of the film, and the average thickness in the transverse direction of the film, respectively.

5. The cellulose ester film of claim 1, wherein the dispersion of the retardation in the plane ($R_0$) of the film is not more than 5%.

6. The cellulose ester film of claim 1, wherein the dispersion of the retardation in the thickness direction ($R_t$) of the film is not more than 10%.

7. The cellulose ester film of claim 1, wherein Std is within the range of from −0.4 to 0.4% and Smd is within the range of from −0.4 to 0.4%, in which Std and Smd represent a rate of dimensional variation in the transverse direction of the film between the films before and after having been heat treated at 80° C. and 90% RH for 100 hours and a rate of dimensional variation in the longitudinal direction of the film between the films before and after having been heat treated at 80° C. and 90% RH for 100 hours, respectively.

8. An optical compensation sheet comprising the cellulose ester film of claim 1, and provided thereon, an optically anisotropic layer.

9. A polarizing plate comprising the cellulose ester film of claim 1, and a polarizing film in which a polyvinyl alcohol film is treated with a dichromatic dye.

10. A displaying device comprising a liquid crystal cell, and the polarizing plate of claim 9 being provided on one side or each side of the liquid crystal cell.

* * * * *